United States Patent [19]
Kroeker et al.

[11] Patent Number: 5,027,408
[45] Date of Patent: Jun. 25, 1991

[54] SPEECH-RECOGNITION CIRCUITRY EMPLOYING PHONEME ESTIMATION

[76] Inventors: John P. Kroeker, 19 McKinley Ave., Beverly, Mass. 01915; Robert L. Powers, 37 Mansion Dr., Topsfield, Mass. 01983

[21] Appl. No.: 36,380

[22] Filed: Apr. 9, 1987

[51] Int. Cl.$^5$ .............................................. G10L 5/06
[52] U.S. Cl. .................................................. 381/43
[58] Field of Search ................................ 381/41–45, 381/46–50, 36–40; 364/513.5

[56] References Cited

U.S. PATENT DOCUMENTS

| | | | |
|---|---|---|---|
| 3,727,193 | 4/1973 | Bolie | 340/172.5 |
| 4,156,868 | 5/1979 | Levinson | 340/146.3 WD |
| 4,227,177 | 10/1980 | Moshier | 340/146.3 R |
| 4,241,329 | 12/1980 | Bahler et al. | 340/146.3 R |
| 4,277,644 | 7/1981 | Levinson et al. | 179/15 D |
| 4,400,788 | 8/1983 | Myers et al. | 364/513 |
| 4,400,828 | 7/1983 | Pirz et al. | 382/30 |
| 4,592,085 | 5/1986 | Watari et al. | 381/43 |
| 4,601,054 | 7/1986 | Watari et al. | 382/1 |
| 4,606,069 | 8/1986 | Johnsen | 382/56 |
| 4,624,010 | 11/1986 | Takebayashi | 381/43 |
| 4,712,243 | 12/1987 | Ninomiya et al. | 381/43 |
| 4,715,004 | 12/1987 | Kaasawa et al. | 364/513.5 |
| 4,718,093 | 1/1988 | Brown | 381/43 |
| 4,723,290 | 2/1988 | Watanabe et al. | 381/43 |

OTHER PUBLICATIONS

Von Schurmann, J. and Becker, D., "Spracherkennung mit Quadratmittel-Polynomklassifikatoren"(Speech recognition by means of mean square polynomial classification), Elektronische Rechenanlagen 20, Jahrgang 1978 Heft 1 and Heft 2.
Hess, W. J., "A Pitch-Synchronous Digital Feature Extraction System for Phonemic Recognition of Speech", IEEE Transactions on Acoustics, Speech, and Signal Processing, vol. ASSP-24, No. 1, Feb. 1976.
Zelinski, R. and Class, F., "A Segmentation Algorithm for Connected Word Recognition Based on Estimation Principles", IEEE Transactions on Acoustics, Speech, and Signal Processing, vol. ASSP-31, No. 4, Aug. 1983.
Zwicker, E. and Terhardt, E., "Automatic Speech Recognition using Psychoacoustic Models", J. Acoust. Soc. Am. 65(2), Feb. 1979.
Herbst, K., "Pattern Recognition by Polynomial Canonical Regression", Pattern Recognition, vol. 17, No. 3, pp. 345–350, 1984.
Duda & Hart, Pattern Classification and Scene Analysis, pp. 130–138, New York: John Wiley & Sons.
Marmarelis & Marmarelis, Analysis of Physiological Systems, pp. 131–171, New York, Plenum Press.
Pardo, "On the Determination of Speech Boundaries: Tool for Providing Anchor Time Points in Speech Recognition", /CASSP86, Tokyo, pp. 2267–2270.
Ukita, et al., "A Speaker Independent Algorithm for Connected Word Using Word Boundary Hypothesis",-/CASSP 86, Tokyo, pp. 1077–1080.
Hiraoka, et al., "Compact Isolated Word Recognition System for Large Vocabulary",/CASSP 86, Tokyo pp. 69–72.

(List continued on next page.)

Primary Examiner—Gary V. Harkcom
Assistant Examiner—John Merecki

[57] ABSTRACT

A phoneme estimator (12) in a speech-recognition system (10) includes trigger circuitry (18, 22) for identifying the segments of speech that should be analyzed for phoneme content. Speech-element processors (24, 26, and 28) calculate the likelihoods that currently received speech contains individual phonemes, but they operate only when the trigger circuitry identifies such segments. The computation-intensive processing for determining phoneme likelihoods is thus performed on only a small subset of the received speech segments. The accuracy of the speech-element processors (24, 26, and 28) is enhanced because these processors operate by recognition of patterns not only in elements of the data-reduced representations of the received speech but also in higher-ordered products of those elements; that is, these circuits employ non-linear modeling for phoneme identification.

29 Claims, 25 Drawing Sheets

OTHER PUBLICATIONS

Haton, et al., "Extraction de Parametres et Comparissim de l'Information; Application a la Reconnaissance de la Parole", Comptes Pandus Hebdonadaires des Seance de l'Academie des Sciences, vol. 273, Part A, No. 10, Sept. 6, 1971, pp. 415–418.

DeMori, et al., "Use of Fuzzy Algorithms for Phonetic and Phonemic Labeling of Continuous Speech", IEEE Trans. Pattern Analysis and Machine Intelligence, vol. PAM 1-2, No. 2, Mar. 1980, pp. 136–148.

Makino, et al., "Automatic Labeling System Using Speaker-Dependent Phonetic Unit References",-/CASSP 86, Tokyo pp. 2983–2786.

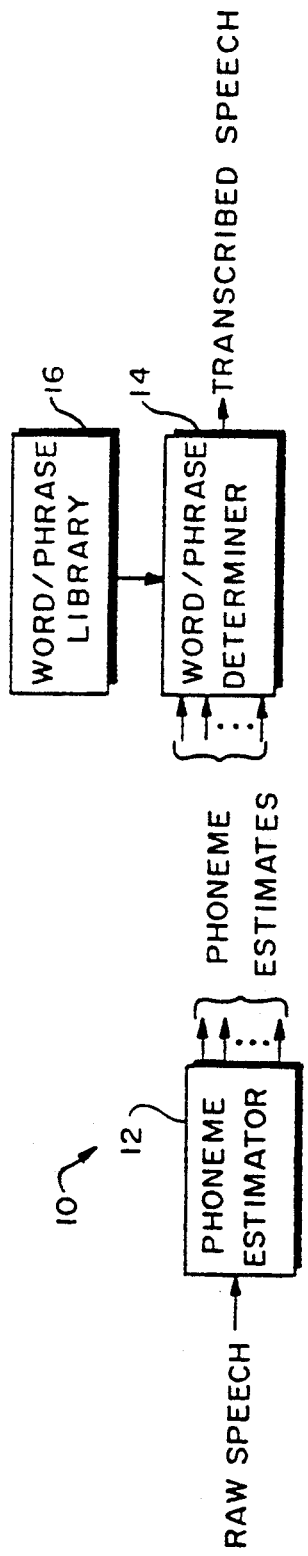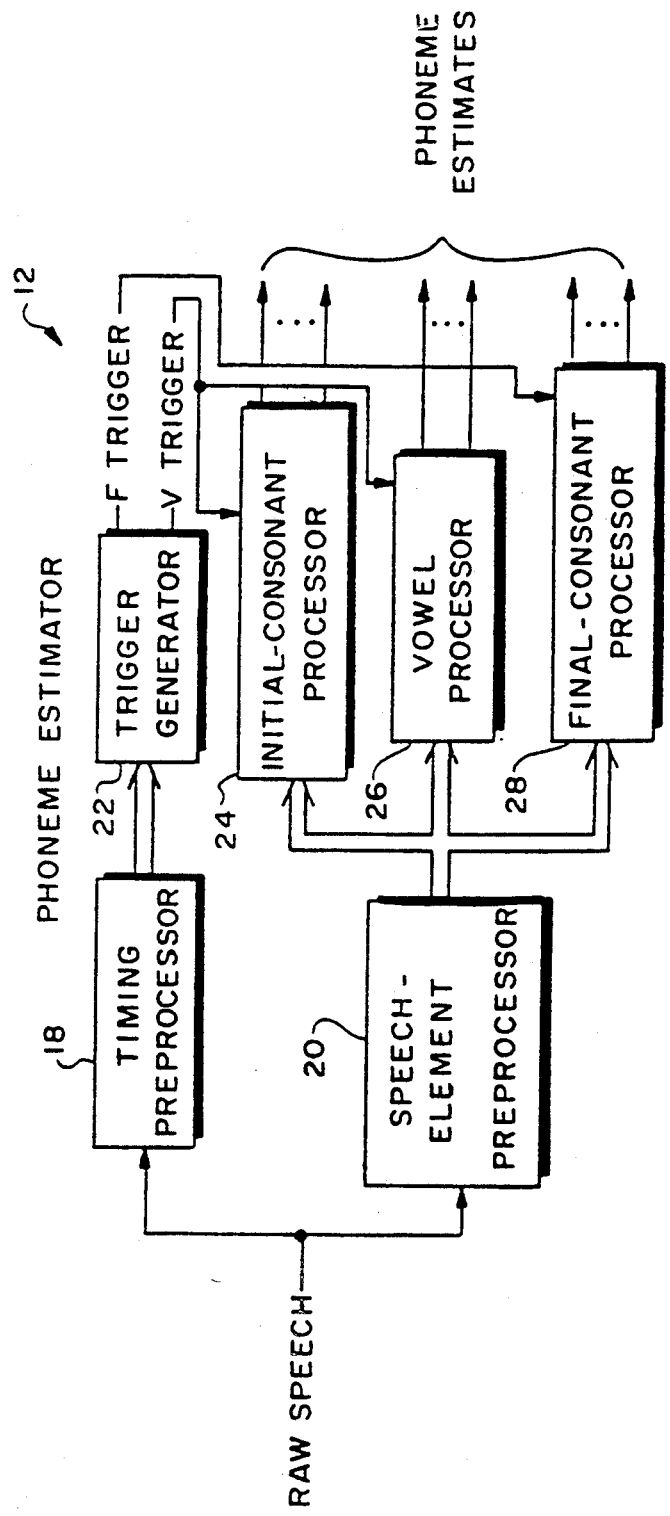
FIG. 1
FIG. 2

$\underline{\underline{D}}^t$ FROM FIG. 8D, BLOCK 114

$\begin{bmatrix} D^t_{0,0} & \cdots & D^t_{0,47} \\ \vdots & & \vdots \\ D^t_{23,0} & \cdots & D^t_{23,47} \end{bmatrix} = \underline{\underline{D}}^t$ COMBINE WITH TIMING DECORRELATION MATRIX $\underline{\underline{D}}^t$ TO PRODUCE $\underline{\underline{V}}''$ AND $\underline{\underline{F}}''$ SUCH THAT $\underline{\underline{V}}'' \cdot \begin{bmatrix} \hat{p}_{m-7} \cdots \hat{p}_m \\ \hat{p}_{m-7} \cdots \hat{p}_m \end{bmatrix} = \underline{\underline{V}}' \cdot \underline{\underline{D}}^t \begin{bmatrix} \hat{p}_{m-6} \cdots \hat{p}_m \\ \hat{p}_{m-7} \cdots \hat{p}_{m-1} \end{bmatrix}$ $\underline{\underline{F}}'' \cdot \begin{bmatrix} \hat{p}_{m-7} \cdots \hat{p}_m \end{bmatrix} = \underline{\underline{F}}' \cdot \underline{\underline{D}}^t \begin{bmatrix} \hat{p}_{m-6} \cdots \hat{p}_m \\ \hat{p}_{m-7} \cdots \hat{p}_{m-1} \end{bmatrix}$,

THAT IS, $V''_{k,l} = \left\{ \sum_{l'=0}^{6} \sum_{i=0}^{23} V'_{i,l'} D^t_{i,k+24(l-l')}, \; 0 \leq l-l' \leq 1 \right.$
$\left. 0, \text{OTHERWISE} \right.$ $F''_{k,l} = \left\{ \sum_{l'=0}^{6} \sum_{i=0}^{23} F'_{i,l'} D^t_{i,k+24(l-l')}, \; 0 \leq l-l' \leq 1 \right.$
$\left. 0, \text{OTHERWISE} \right.$ $0 \leq k \leq 23$
$0 \leq l \leq 7$ $\begin{bmatrix} V''_{0,0} & \cdots & V''_{0,7} \\ \vdots & & \vdots \\ V''_{23,0} & \cdots & V''_{23,7} \end{bmatrix} = \underline{\underline{V}}''$ $\begin{bmatrix} F''_{0,0} & \cdots & F''_{0,7} \\ \vdots & & \vdots \\ F''_{23,0} & \cdots & F''_{23,7} \end{bmatrix} = \underline{\underline{F}}''$

FROM BLOCK 104 OF FIG. 7C

DEVELOPMENT SYSTEM: CALCULATION
OF h-PHONEME MODELING MATRIX

LABEL SPEECH SEGMENTS — 140

$$L_n^h = \begin{cases} 1 & \text{IF THE SPEECH IN THE RECEPTIVE FIELD (FIG. 6A, BLOCK 64) USED TO EXTRACT THE DATA FOR THIS n CONTAINS THE "h"-PHONEME} \\ 0 & \text{OTHERWISE} \end{cases}$$

FORM KERNEL — 142

$$K_l^h = \frac{1}{N}\sum_{n=0}^{N-1}(L_n^h - \mu_{Lh})b_{l,n}$$

WHERE THE MEAN $\mu_{Lh}$ OF THE LABEL DATA IS GIVEN BY $\mu_{Lh} = \frac{1}{N}\sum_{n=0}^{N-1}L_n^h$ Input: $b_{0,n} \ldots b_{k,n} \ldots b_{379,n}$ FROM BLOCK 138 OF FIG. 9B Output: $K_0^h \ldots K_l^h \ldots K_{379}^h$

NORMALIZE — 144

$$K_l^{h'} = \frac{K_l^h - \mu_{Kh}}{\sigma_{Kh}},$$

WHERE THE MEAN $\mu_{Kh}$ AND STANDARD DEVIATION $\sigma_{Kh}$ OF THE KERNEL ARE GIVEN BY $$\mu_{Kh} = \frac{1}{380}\sum_{l=0}^{379}K_l^h \qquad \sigma_{Kh} = \frac{1}{380}\sqrt{\sum_{l=0}^{379}(K_l^h - \mu_{Kh})^2}$$

FIG. 11A

SPEECH-RECOGNITION CIRCUITRY EMPLOYING PHONEME ESTIMATION

BACKGROUND OF THE INVENTION

The present invention is directed to speech recognition. It is directed particularly to those parts of speech-recognition systems used in recognizing patterns in data-reduced versions of the received speech.

Most systems for recognizing speech employ some means of reducing the data in the raw speech to representations of the speech that include less than all of the data that would be included in a straight digitization of the speech-signal input but that still contain most if not all of the data needed to identify the meaning intended by the speaker. In development, or "training" of the speech-recognition system, the task is to identify the patterns in the reduced-data representations that are characteristic of speech elements, such as words or phrases. Of course, the sounds made by different speakers uttering the same phrases are different, and there are other sources of ambiguity, such as noise and the inaccuracy of the modeling process. Accordingly, routines are used to assign likelihoods to various mathematical combinations in the elements of the reduced-data representation of the speech, and various hypotheses are tested to determine which one of a number of possible speech elements is most likely the one currently being spoken.

The processes for performing these operations tend to be computation intensive. The likelihoods must be determined for large numbers of speech elements, and the limitation on computation imposed by requirements of, for instance, real-time operation limit the sensitivity of the pattern-recognition algorithm that can be employed.

It is accordingly an object of the present invention to increase the computational time that can be dedicated to recognition of a given pattern but to do so without increasing the time required for the total speech-recognition process. It is a further object to improve the speech-recognition process.

SUMMARY OF THE INVENTION

The foregoing and related objects are achieved in a speech-recognition system that employs a phoneme estimator, which produces estimates from which further processing can be performed to identify the words or phrases spoken. The phoneme estimator includes a trigger generator that inspects a reduced-data representation of all segments of new speech that the speech-recognition system receives. When it detects in that representation a pattern that is characteristic of a broad class of phonemes, it triggers a speech-element processor, which then computes for each of a number of phonemes of that class the likelihood that that phoneme occurred at that time. Since the speech-element processor operates only when it has been triggered, it operates on only a small subset of the segments of the incoming speech. Therefore, the amount of computation that it can dedicate to the identification of any given speech element is greater than the amount that it could dedicate if the computation had to be performed on every segment of the incoming speech.

According to another aspect of the invention, the computation for recognition of patterns in the reduced-data representation of the speech employs non-linear modeling; that is, it searches for patterns not in only the elements themselves but also in the results of their multiplication. This increases the accuracy of the modeling process.

BRIEF DESCRIPTION OF THE DRAWINGS

These and further features and advantages of the present invention are described in connection with the accompanying drawings, in which:

FIG. 1 is a block diagram of a speech-recognition system that employs the teachings of the present invention;

FIG. 2 is a block diagram depicting the phoneme estimator of FIG. 1 in more detail;

FIGS. 7A, 7B, 7C, and 7D together constitute a block diagram depicting a portion of a development system for generating the trigger matrices employed in the trigger generator of FIG. 3;

FIGS. 11A and 11B together constitute a block diagram of a portion of a development system for calculating the modeling matrix employed in the speech-element processor of FIGS. 6A, 6B, and 6C;

DETAILED DESCRIPTION OF ILLUSTRATIVE EMBODIMENTS

Figure 3:
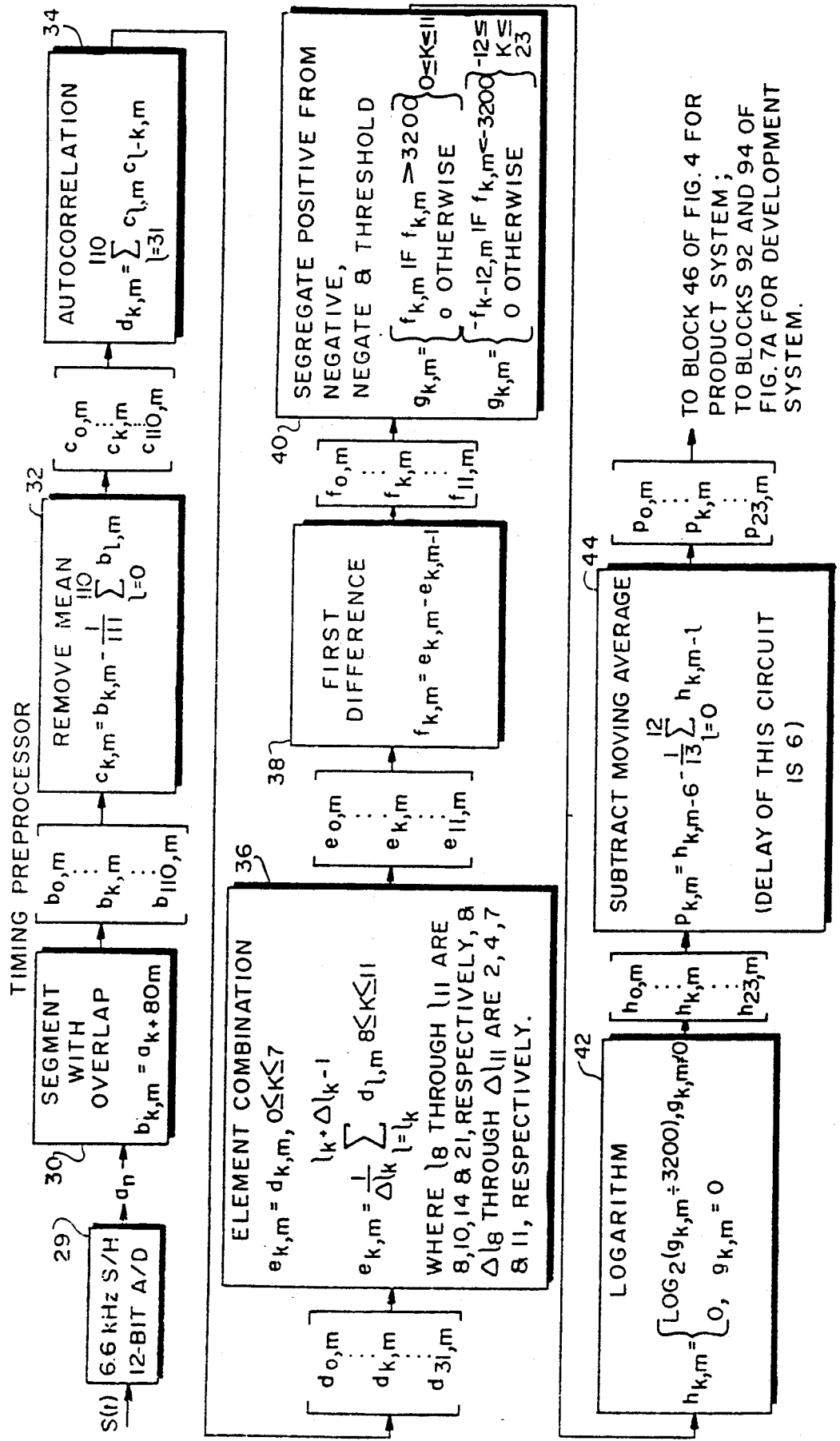
FIG. 3 is a block diagram illustrating the timing preprocessor of FIG. 2 in more detail.

This specification describes both a product system for recognizing speech and a development system for "training" the product system—i.e., for determining parameters to be employed by the product system. FIGS. 1-6 depict one embodiment of the product system, and FIGS. 7-11 depict parts of the corresponding development system.

Product System: Overview

A speech-recognition system 10 of FIG. 1 employs the phoneme-identifying circuitry of the present invention. A speech signal in the form of, say, the output of a microphone is received by a phoneme estimator 12 that incorporates the teachings of the present invention. The output of the phoneme estimator at any given time is a group of outputs, each output being a value, which we call an "estimate," derived from the likelihood that the speech being received at that time constitutes the phoneme associated with that output.

Ideally, one output would indicate a very high likelihood, while all of the others would indicate much lower likelihoods, so a single phoneme would be identified. As a practical matter, however, noise, variations in voices, and departures of the phoneme estimator 12 itself from the ideal sometimes result in a group of outputs that are more ambiguous. A word/phrase determiner circuit 14 receives the estimates and, by consulting a library 16 of words and phrases listed in terms of constituent phonemes, eliminates the less-likely phonemes from consideration and determines which words and phrases have been received. The output of the word/phrase determiner 14 is transcribed speech in the illustrated embodiment, but the output can take a simpler form, such as an indication of which of a group of possible expected answers has been spoken.

The details of the word/phrase determiner 14 will not be set forth here, since the specific way in which the phoneme estimates are further processed is not part of the present invention, but it is of interest that the word/phrase determiner 14 operates strictly on the estimates produced by the phoneme-estimation circuit 12; that is, the word/phrase determiner 14 does not operate on data in a more-primitive form, such as the raw speech itself or its frequency spectrum.

FIG. 2 depicts the phoneme estimator 12 in more detail. Two separate preprocessors 18 and 20 receive the raw speech and perform initial data reduction. The data reduction, which will be described in more detail below, consists of a number of data-reduction steps such as normalization, taking of power spectra, etc. Most such steps are employed, though not in the same combinations, in the initial phases of other speech-recognition systems. The preprocessors 18 and 20 are similar in many ways, but the particular preprocessing steps that we have chosen for the timing preprocessor 18 are those that forward information best suited to recognizing the times at which new speech elements occur, while the speech-element preprocessor 20 consists of data-reduction elements that forward information more suited to the identification of the specific speech elements, which are phonemes in the illustrated embodiment.

The output of the first preprocessor 18 is fed to a trigger generator 22, which indicates when a new speech element has likely occurred. It generates a "V trigger" if the likely occurrence is of a vowel or an initial consonant, and it applies this output to an initial-consonant processor 24 and a vowel processor 26. It generates an "F trigger" if it is a final consonant that likely occurred, and it applies this output to a final-consonant processor 28.

Whenever the trigger generator 22 produces a V trigger, processors 24 and 26 generate a number of outputs, each of which is an "estimate" derived from the likelihood that a particular initial-consonant or vowel phoneme has occurred. When the V trigger is not produced, these circuits indicate that, according to their estimates, there is no likelihood that such phonemes have occurred.

Similarly, the F trigger causes the final-consonant processor 28 to produce a number of outputs, each of which is an "estimate" derived from the likelihood that the currently received speech consists of a given final consonant.

Suppose the raw speech is the word cat. The initial-consonant and vowel processors 24 and 26 will be triggered to operate by the V trigger, which indicates the occurrence of the combination of the consonant and the vowel. These processors will accordingly produce a number of outputs in parallel, each of which represents the likelihood that that particular initial consonant or vowel was spoken. The output for the "k" sound will likely be the greatest among those outputs from the initial-consonant processor 24. Likewise, the output for the short-a sound will likely be the greatest among those outputs from the vowel processor 26. The word/phrase determiner 14 will take into account these outputs as well as previous and subsequent outputs, and it will conclude that the first spoken phoneme was the "k" sound and that the next spoken phoneme was the short-a sound.

Next, the final "t" sound will cause only the final-consonant processor 28 to be triggered by the F trigger, and the output that processor 28 generates for the "t" sound in response will typically be greater than the outputs that it generates for the other final-consonant phonemes. Thus, the word/phrase determiner 14 determines that the speaker spoke the word cat.

Because of speech variations, the word cat can result in more than just a single V trigger, at which both the initial consonant and the vowel are processed, and a single F trigger, at which the final consonant is processed. For instance, the initial consonant and vowel may cause, and be processed in response to, different V triggers, the trigger for the initial consonant coming before that for the vowel. In addition, there may be more than one trigger that is used for processing any of the consonants or vowels in the word. Often, particularly if the pronunciation of the word is somewhat drawn out, the pronunciation of, say, the short-a sound will cause multiple triggers of the initial-consonant and vowel processors. The outputs of those processors will therefore indicate repeated pronunciations of that sound, but the word/phrase determiner 14 is programmed to recognize such multiple occurrences as the single short-a sound in one word. Additionally, there may be a large initial-consonant "t" output on a given V trigger after one used to process the short-a vowel. The word/phrase determiner, taking into account previous and subsequent outputs, may then accept the initial-consonant output for "t" to end the spelling of cat. In short, the word/phrase determiner 14 may be provided with a wide variety of routines for inferring from a sequence of phoneme estimates that a particular word has been spoken. Since the specific operation of the word/phrase determiner is not part of the present invention, however, we will not describe it further.

The segregation of the functions into trigger generation and phoneme identification reduces computation because the individualized processing for each of the relatively large number of possible phonemes occurs only upon a trigger, not upon every preprocessor output.

Timing Preprocessor

The timing preprocessor 18 of FIG. 2 is depicted in more detail in FIG. 3. A digitizer 29 consisting of a 6.6-kHz sample-and-hold circuit and a 12-bit analog-to-digital converter processes the speech signal s(t) to produce a sequence of digital signals $a_n$ representing the amplitudes of the various samples. The next block 30 represents the step of separating the sequence of $a_n$'s into subsequences of 111 samples that overlap by thirty-one samples so that each subsequence includes eighty new samples. Each subsequence can be thought of as a vector $b_m$ with elements $b_{k,m}$. Since the mean, or D.C., value of the input stream carries no information of value to the speech-recognition effort, the mean value of the elements in each vector is removed by circuit 32.

It should be noted at this point that the drawings represent the various processes as being performed by separate circuits, as they could be in an appropriate hardwired system. This segregation into separate circuits facilitates the description, but those skilled in the art will recognize that most of these functions will typically be performed by a relatively small number of common hardware elements. Specifically, most of the steps would ordinarily be carried out by one or a very small number of microprocessors.

The reason for the overlap in the segmentation performed by block 30 becomes apparent when the step represented by block 34 is considered. This step is the autocorrelation of the samples within each subsequence. The autocorrelation is computed for thirty-two lags (including a "lag" of zero) so that an overlap of thirty-one samples is needed. For every eighty samples produced by the digitizer 29, one vector $d_m$ is produced. Each vector $d_m$ consists of thirty-two elements $d_{k,m}$, $0 \leq k \leq 31$.

The autocorrelation step, like most of the other preprocessing steps, is one that is likely to eliminate data that are not valuable to the identification of speech elements but to preserve data that are. However, the specific choice of autocorrelation is not critical; indeed, we intend in some versions of this invention to employ discrete Fourier transformation in place of the autocorrelation step.

The choices of data-reduction steps are compromises between retention of information and reduction in computation time. The latter factor dictates the next step, represented by block 36, in which some individual vector elements are retained unchanged while others are combined by averaging with each other to reduce the thirty-two-element vector $d_m$ to a twelve-element vector $e_m$.

The next block 38 in the timing preprocessor represents the calculation of the first difference. Again, the choice of a difference step is based on the assumption that almost all of the information relating to timing is retained in the first differences, while much information that does not contribute to timing determination is eliminated by the subtraction that produces those differences. Although we believe that this is a valuable step in the timing preprocessing, preprocessors using combinations of steps that do not include the calculation of the first difference can successfully carry out the teachings of the present invention.

We also believe that it is advantageous to treat positive differences differently from negative differences in subsequent processing. We therefore include a step, represented by block 40, in which we segregate the positive elements from the negative elements by placing them in different vector locations.

The operations depicted in block 40 represent not only positive-negative segregation but also noise reduction. In order to understand the purpose of these operations, it is helpful to know that the illustrated embodiment employs floating-point representations after the first computation step in block 32 so that there is enough range in the representations to include the highest possible output of the autocorrelation step, which is approximately plus or minus $3 \times 10^8$ (i e., approximately $80 \times 2048 \times 2048$). With a range of this magnitude, relatively small-valued elements probably represent noise. In this embodiment, we treat values of 3200 or below as "small-valued." We eliminate these small values as part of the segregation process of block 40. An input element $f_{k,m}$ results in a corresponding output element $g_{k,m}$ if $f_{k,m}$ is greater than 3200. Otherwise, the corresponding element $g_{k,m}$ is zero. Another element $g_{k+12,m}$ is equal to $-f_{k,m}$ if $f_{k,m}$ is more negative than $-3200$. Otherwise, $g_{k+12,m}$ is zero. The step of block 40 therefore produces a twenty-four element vector $g_m$ in which at least half of the elements are equal to zero.

Although the very smallest-amplitude elements in the output of block 40 probably represent noise, small variations in other low-amplitude elements probably contain more information than variations of the same absolute size in high-amplitude elements. That is, the meaning is probably in the relative, rather than in the absolute, sizes of the variations. In recognition of this assumption, the logarithms of the vector elements are taken in the step represented by block 42. More precisely, the logarithm of the element value divided by 3200 is taken unless that element value is zero, in which case the output of block 42 for that element is zero. Note that the segregation step of block 40 results only in elements that are positive or zero; there is thus no need in block 42 to deal with the (undefined) logarithm of a negative number.

The next block 44 represents subtracting from each element the moving average of the corresponding elements in the surrounding thirteen vectors. Again, we provide this step because we believe that a step of this type removes information of lesser importance while retaining the most-significant information. More specifically, the purpose of the trigger generator that receives the output of block 44 is to identify the places in the speech at which there are significant changes in the speech patterns, such as the onset or offset of voicing. We believe that subtraction of the moving average causes such changes to stand out in bolder relief. The output vector $p_m$ of block 44 is the output of the timing preprocessor 18 of FIG. 2.

Note that the step represented by block 44 introduces a delay of six; $p_m$ is equal to $h_{m-6}$ with its moving averages removed. Compensation for this and other delays in the trigger generation will be described in the discussion accompanying FIG. 6A.

Trigger Generator

Figure 4:
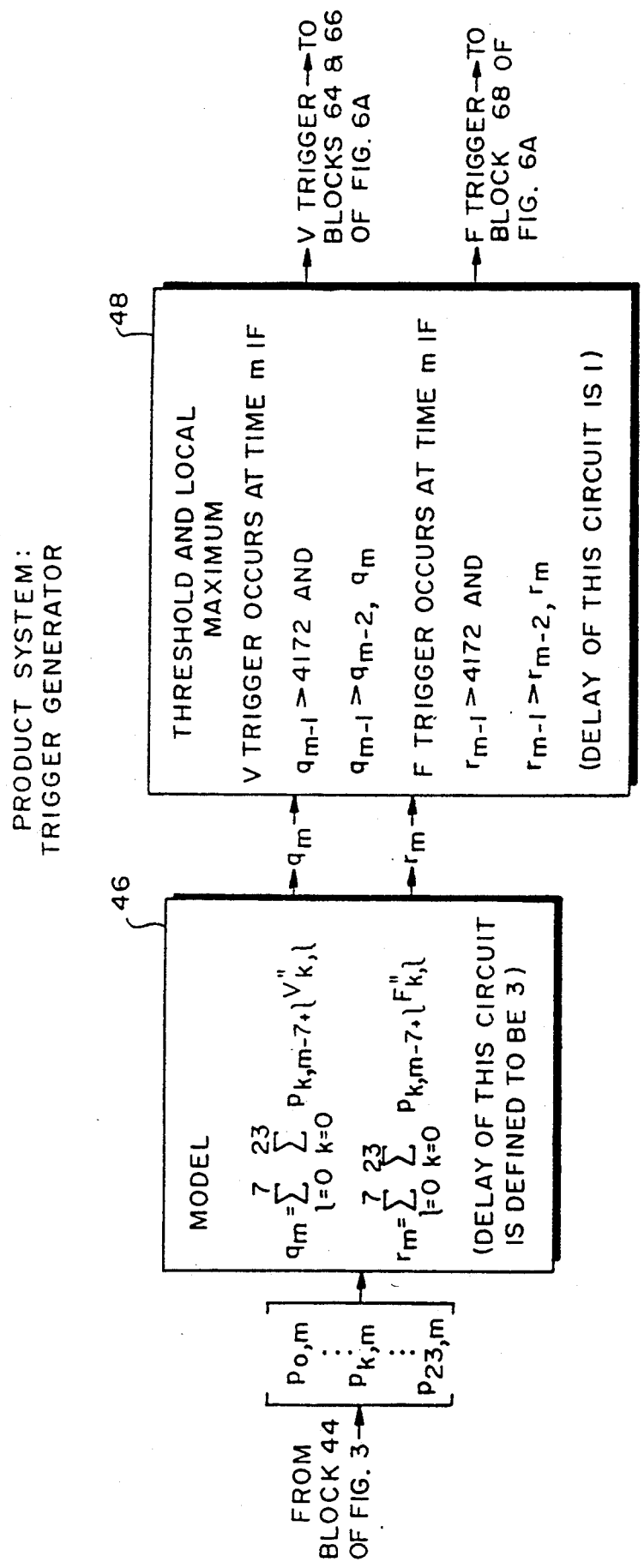
FIG. 4 is a block diagram illustrating the trigger generator of FIG. 2 in more detail.

The trigger generator 22 of FIG. 2 is depicted in more detail in FIG. 4. To identify the occurrences of speech elements—that is, to generate trigger signals—the output of the timing preprocessor 18 is "modeled" with trigger matrices V" and F" in block 46 for patterns that have previously been identified, by observation of known speech, to be characteristic of phonemes of the various classes. Specifically, for each m, the matrix consisting of the eight vectors $p_{m-7}, \ldots, p_m$ is separately scalar multiplied by two trigger matrices V" and F". Each of these trigger matrices has a separate element corresponding to each element in the matrix $[p_{m-7}, \ldots, p_m 9$, and each trigger-matrix element represents the degree to which its corresponding element in $[p_{m-7}, \ldots, p_m]$ is indicative of the occurrence of a phoneme of the given type. Positive elements in the trigger matrix will yield positive contributions to the scalar product when multiplied by positive corresponding elements in the data matrix. Likewise, negative elements in the trigger matrix will yield positive contributions to the scalar product when multiplied by negative corresponding elements in the data matrix. The result of multiplication by the V" matrix is a scalar $q_m$ that is indicative of whether the matrix $[p_{m-7}, \ldots, p_m]$ resulted from a vowel or an initial consonant, while the result of multiplication by the F" matrix is a scalar $r_m$ that is indicative of whether that matrix resulted from a final consonant. For reasons that will be explained in the discussion of the trigger-matrix generation, we consider block 46 to introduce a delay of three.

In the step represented by block 48, each of the resultant outputs $q_m$ and $r_m$ is compared with a threshold value of 4172. Values above the threshold are considered to represent the occurrence of a phoneme of that class, while values less than or equal to the threshold are not. Since a single pronunciation of a given phoneme can be expected to cause several sample groups in succession to result in a $q_m$ or $r_m$ value above the threshold, each $q_m$ or $r_m$ value that exceeds the predetermined threshold value is compared with the nearest previous value and the nearest subsequent value to determine whether the $q_m$ or $r_m$ value is a local maximum. A V or F trigger is then produced to indicate the time at which each local maximum occurs. The V and F triggers are the two outputs of the trigger generator 22 of FIG. 2.

We have indicated in block 48 that it imposes a delay of one time unit. This results in a final accumulated delay of ten for the timing preprocessor and the trigger generator together; six from the moving-average subtraction of block 44, three from the scalar multiplication by the matrices in block 46, and one from the local-maximum step of block 48. The V and F triggers are thus delayed by ten time units with respect to the output of the speech-element preprocessor, which we consider now.

Speech-Element Preprocessor

Figure 5:
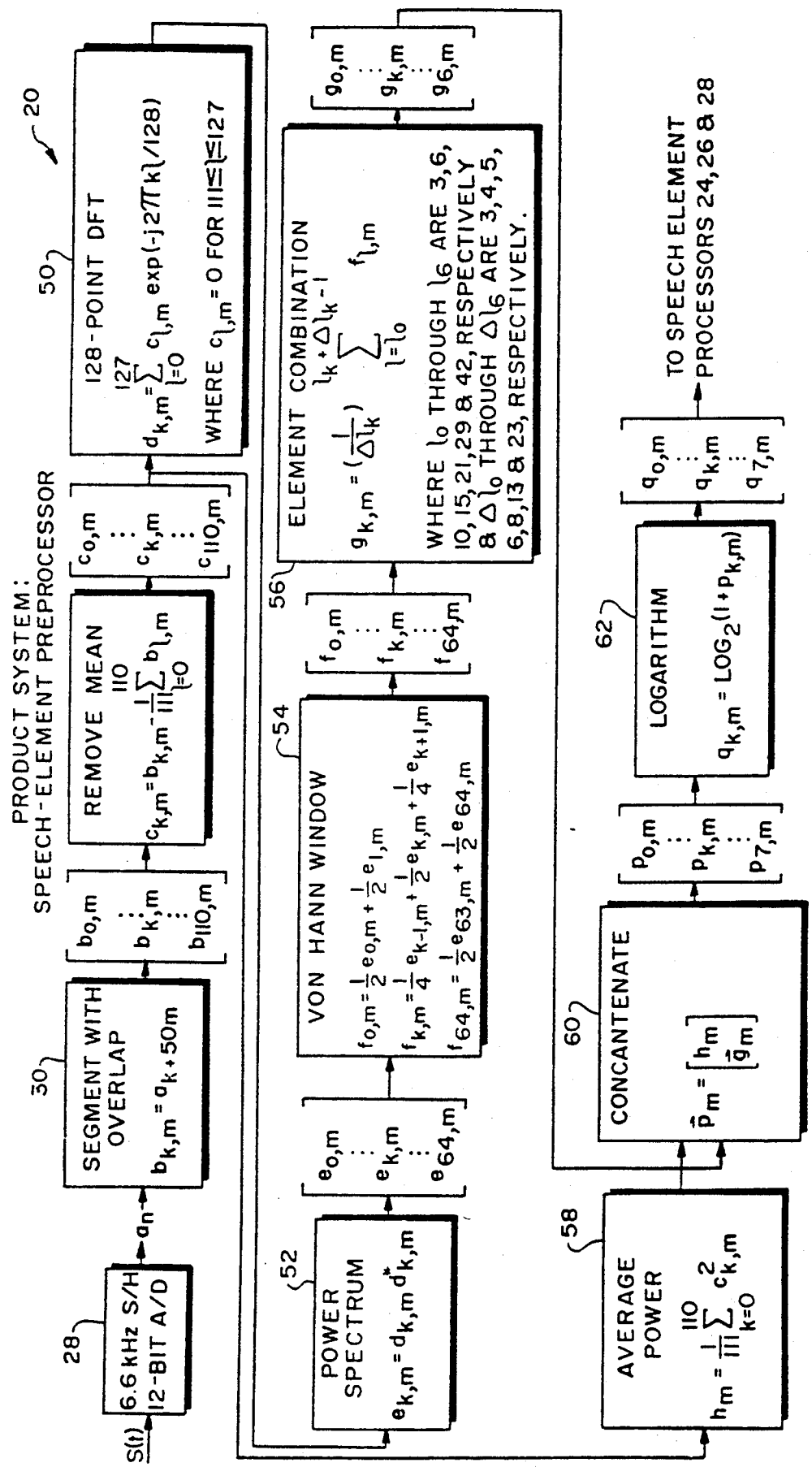
FIG. 5 is a block diagram depicting the speech-element preprocessor of FIG. 2 in more detail.

FIG. 5 depicts the speech-element preprocessor 20 of FIG. 2 in detail. Like preprocessor 18, preprocessor 20 begins with digitizing, segmenting, and removal of the mean value, as blocks 28, 30, and 32 indicate in FIG. 5. These are the same as the first three blocks of FIG. 4. As will become apparent below in connection with the discussion of block 56, the information removed in the step represented by block 32—i.e., the mean value—would be eliminated by later processing even if the step represented by block 32 were not performed. Theoretically, therefore, the block-32 step is superfluous. However, we perform this step because the numerical techniques that we employ in the subsequent step are subject to accuracy reduction if a relatively large D.C. (mean) component is present.

The next block 50 in FIG. 4 represents a 128-point discrete Fourier transform (DFT). The final 17 input points (128−111=17) are zeros. The use of the zeros, which results from our retention of the segmentation routine that we employed in previous versions of the apparatus, before we began to use the DFT, will probably be eliminated as we refine our device.

Since the input to the DFT is purely real, only sixty-five of the 128 complex outputs of the DFT represent nonredundant data. Therefore, the output of block 50 is a sixty-five-element complex vector $d_m$.

Block 52 represents the generation of a power spectrum. Specifically, the generally complex DFT values $d_{k,m}$ are multiplied by their complex conjugates $d^*_{k,m}$ to generate corresponding real values $e_{k,m}$. This reduces the amount of data at this point by a factor of two, while retaining, we believe, most of the information required for phonemic identification. The next, "von Hann window" block 54 represents a smoothing of the spectrum in a conventional manner to reduce the sidelobes that result from truncation in the time domain. The resultant vector is then processed, as block 56 indicates, to reduce the sixty-five-element vector $f_m$ to a seven-element vector $g_m$. In this processing, the elements representing the lowest frequencies are dropped, and groups of others are combined by averaging, so as to reduce the subsequent computational burden. We believe that the lowest frequency components are not necessary to the phoneme-identification process, and the averaging of frequency components is a compromise between information retention and computation reduction.

We also believe that some additional information of value resides in the average power of the signal. Block 58 represents calculation of the average power $h_m$ in the group of samples used to produce the corresponding DFT of block 50. This average power $h_m$ is then concatenated in block 60 with the seven-element vector $g_m$ to yield the eight-element vector $p_m$. The average power $h_m$ determined in the step represented by block 58 contains low-frequency components that we eliminated in the element combinations of block 56. Since we believe that these lowest frequency components carry no information of value to the phoneme-identification process, we intend in some versions of this invention to calculate the average power from only those spectral components that are used to form the element combinations. In such versions we will calculate the average power from a truncated (high-pass) version of either the power spectrum or the windowed power spectrum. The phoneme-identification information probably resides in the relative, rather than in the absolute, sizes of variations of the individual elements $p_{k,m}$ of vector $p_m$. Accordingly, these elements, which are all positive or zero, are incremented by one, and the logarithms of the results are computed, as block 62 indicates. The incrementation by one insures that all of the resulting logarithms are zero or positive. The resultant eight-element vector $q_m$ is the output of the speech-element preprocessor 20 of FIG. 2.

Speech-Element Processors

Figure 6A:
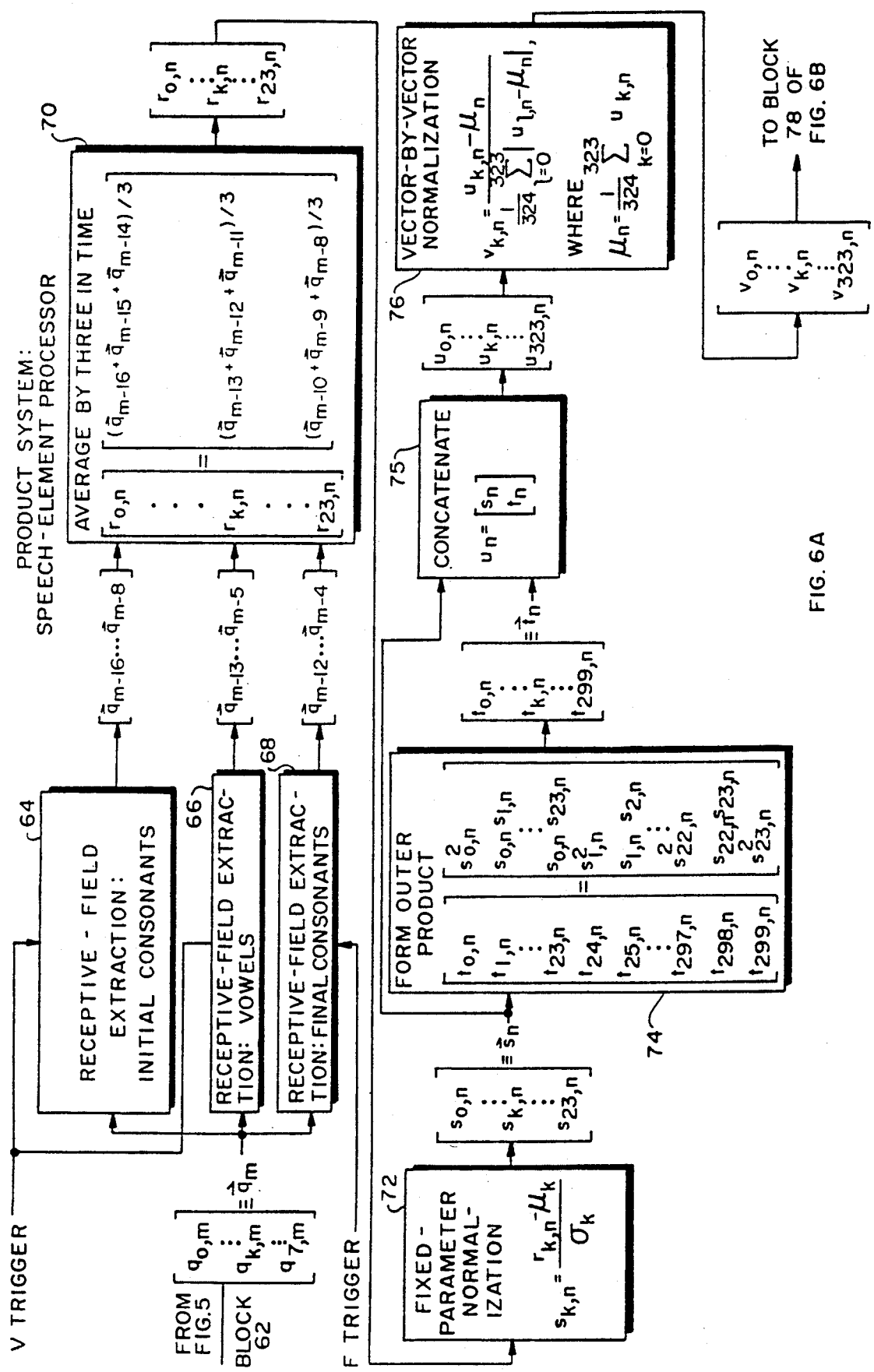
FIGS. 6A, 6B, and 6C together constitute a block diagram depicting the speech-element processor of FIG. 2 in more detail.
Figure 6B:
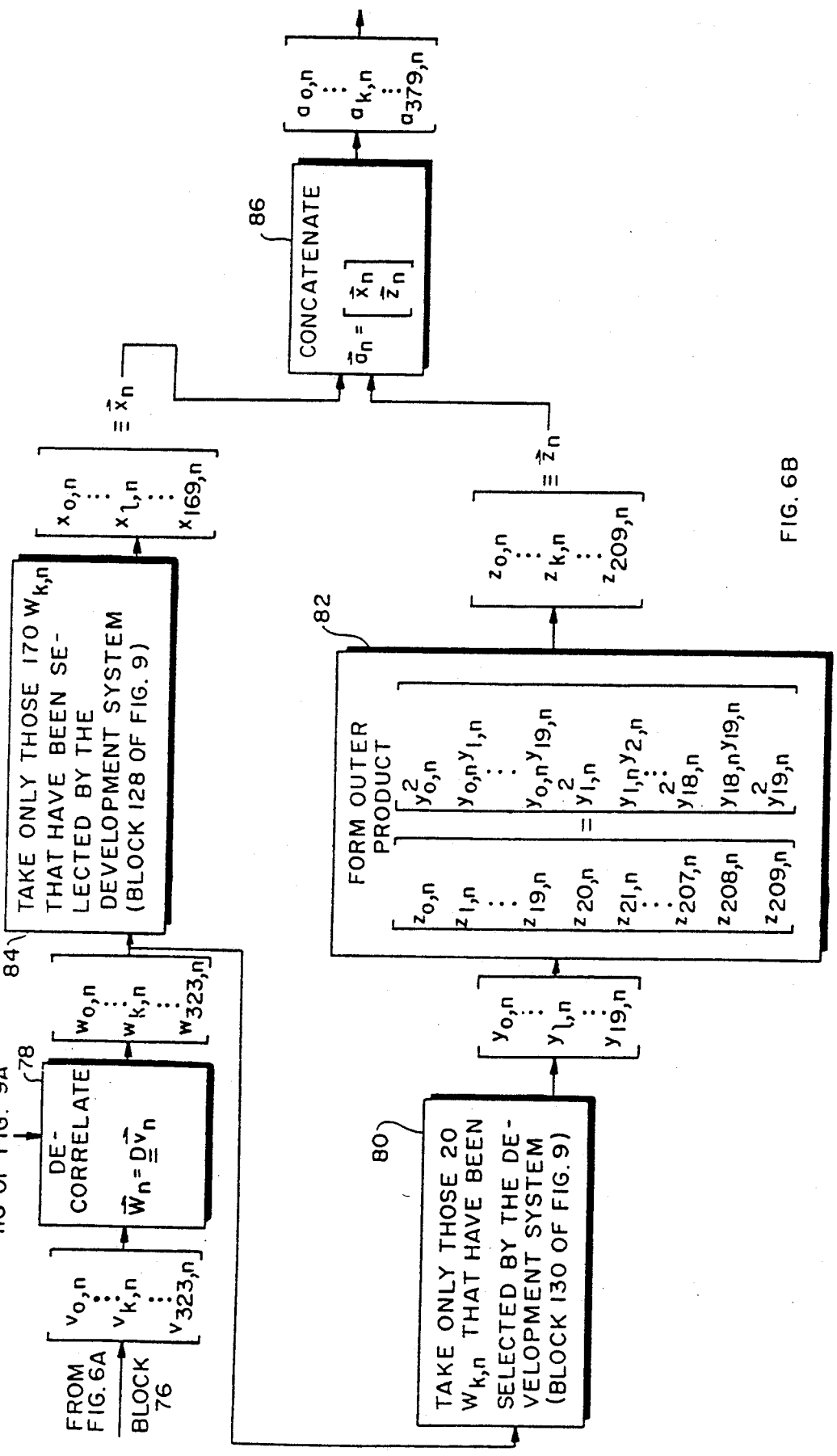
Figure 6C:
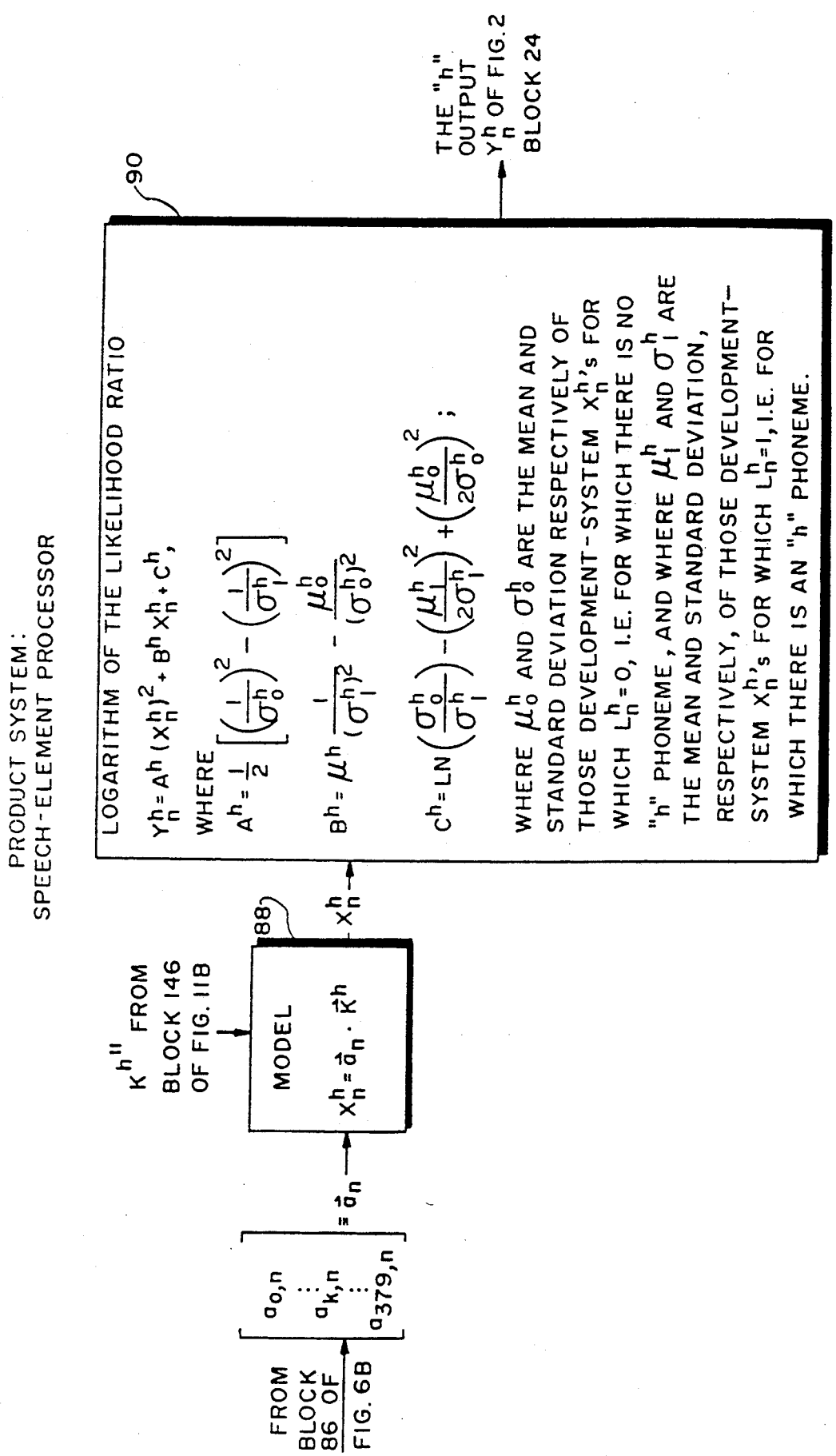

The purpose of the circuits of the speech-element preprocessor of FIG. 5 is to reduce the incoming data to a manageable quantity. The result is a data-reduced representation of the input that the speech-element processors 24, 26, and 28 of FIG. 2 inspect for patterns that represent the individual phonemes. FIGS. 6A, 6B, and 6C depict details of these speech-element processors.

Blocks 64, 66, and 68 of FIG. 6A represent functions performed by circuits 24, 26, and 28, respectively, of FIG. 2. Specifically, each one of blocks 64 and 66 represents the assembly of a receptive field—i.e., of a group of nine successive vectors $q_m$, for each m for which the trigger generator 22 of FIG. 2 has produced a V trigger. Block 68 represents the assembly of a receptive field for each m for which the trigger generator 22 of FIG. 2 has produced an F trigger.

As has previously been intimated, many of the steps described previously, such as the generation of a discrete Fourier transformation, the normalization, and so on are steps conventionally performed by other speech-recognition systems, although not necessarily in the same combination. Additionally, some of the steps yet to be described bear some similarity to the pattern-recognition steps of many existing systems. According to the present invention, however, these further steps are performed only on the receptive fields. The receptive-field assembly represented by blocks 64, 66, and 68 eliminates all other vectors $q_m$ from further processing. This reduces the overall amount of processing and, we believe, additionally contributes to accuracy in phoneme identification.

The extraction steps 64, 66, and 68 are similar to each other. If the trigger generator 22 generates a V trigger for time element m, the extraction step represented by block 64 assembles a receptive field consisting of the nine vectors $q_{m-16}, \ldots, q_{m-8}$, while the extraction step represented by block 66 assembles a receptive field consisting of the nine vectors $q_{m-13}, \ldots, q_{m-5}$. If the trigger generator 22 generates an F trigger for time element m, the extraction step represented by block 68 assembles a receptive field consisting of the nine vectors $q_{m-12}, \ldots, q_{m-4}$. If the trigger generator 22 does not produce a V or F trigger for a particular time element m, a receptive field is not assembled for that time element.

Much of the delay imposed between the occurrence of a V or F trigger and the group of vectors $q_m$ assembled in response is compensation for the ten time units by which the V and F triggers are delayed with respect to the outputs of the speech-element preprocessor 20. The differences among the delays imposed by the different circuits 64, 66, and 68 result from our experience with the differences in timing between the portions of the speech most characteristic of the identities of the phonemes.

With two exceptions to be identified later, the rest of the components of each of the phoneme-identifying circuits 24, 26, and 28 are identical to those of the other two, so FIGS. 6A, 6B, and 6C illustrate the remaining components only of circuit 24. (Again, although the system is described in terms of separate "circuits," these functions are typically performed by a common microprocessor executing similar routines.)

Once the receptive field has been chosen, a further step is taken to reduce data and the accompanying computational burden. Specifically, the nine vectors of the receptive field are broken into groups of three, and corresponding elements in the three vectors of a group are averaged so that three eight-element vectors result. These three vectors are concatenated to produce a single twenty-four-element vector $r_n$ from each receptive field. Block 70 represents the averaging and concatenation.

The vector index changes from m to n in block 70 to reflect the data elimination performed by the receptive-field extraction step of block 64. Because that step assembles receptive fields for only those values of m for which a V trigger was produced, the step of block 70 does not operate on a receptive field for every value of m; there are "holes" in the sequence of m's. The index n represents a renumbering that eliminates the "holes."

As will be described in more detail below in connection with the description of the development system, certain constant vectors and matrices used in the product system of FIGS. 1–6 are obtained from a development system that processes a large store of sample speech produced by one or more human speakers. To generate the constants, the development system subjects all of the speech in the store to all of the processing steps described so far, so it generates a large number of vectors $r_n$ corresponding to those produced in the step represented by block 70. The development system computes the mean (mu) and standard deviation (sigma) of each of the elements over all of these vectors $r_n$, and these constants are employed in the product system of FIGS. 1–6 to normalize each of the elements of the subject $r_n$ vector by subtraction of the mean and division of the result by the standard deviation, as block 72 indicates. The result is a normalized vector $s_n$. We perform this normalization because it is likely that what is important in a quantity represented by a vector element is not its value in an absolute sense but rather how its deviation from the mean compares with the standard deviation of the corresponding elements in all of the vectors. That is, a small variation in a quantity that is subject to only small variations is likely to be more important than a variation of similar size in a quantity that varies more widely. Moreover, the normalization reduces the computational dynamic range required of subsequent processing.

As will become clearer as the description proceeds, the phoneme-identification process is designed as a model of the human process for recognizing phonemes. Indeed, it employs observations of human beings listening to recorded (or live) speech and labeling sections of the speech with the phonemes that they recognize. In one sense, the input to the "system" is the pressure waves that constitute sound heard by the human being, while the output is the phoneme symbols with which he labels short passages of the sound. During "training" in a development apparatus such as that which will be described in connection with FIGS. 7–11, the human "system" is modeled by correlating the output with the input.

To make the correlation process manageable, however, our modeling process—and, indeed, the modeling processes of all speech-recognition systems of which we are aware—employs a significant amount of data reduction before the correlation process is begun. That is, the correlation process does not involve correlating the phoneme symbols (or, in other systems, symbols for words or phrases) directly with the values of the pressure amplitudes that constitute the sound. Instead, the output symbols are correlated with the results of a series of data-reduction steps such as those described up through block 72 of FIG. 6A. In most previous systems, the training is then performed by correlating phonemes, words, or phrases with the elements of a vector such as vector $s_n$ produced by the series of data-reduction steps.

In contrast, the development system of FIGS. 7–11 performs further steps before the correlation so as more directly to treat the modeled system as a nonlinear system. We have found that we achieve greater accuracy if, instead of correlating the phonemes only with the elements of $s_n$, we correlate the phonemes with a nonlinear representation consisting of both those elements and their products and powers to determine the parameters to be used in the product system of FIGS. 1-6. The first of these steps is reflected in the product system by block 74, which represents the formation of the outer product of $s_n$—i.e., the formation of all distinct products of the elements of $s_n$. Block 75 shows that the vector $s_n$ is concatenated with its outer product to produce a non-linear representation. This non-linear representation is a 324-element vector $u_n$.

The use of the outer product at this point in the processing has two effects. First, it makes second-order terms available to the subsequent modeling process, thereby enabling the subsequent modeling process to respond nonlinearly to the elements of $s_n$ and thus to mimic the undoubtedly nonlinear human "system" more closely. This increases the accuracy over that of a modeling process for which the input data stream does not have this nonlinearity. Second, the use of the outer product greatly increases the size of the vector that is passed to the subsequent modeling process. For instance, the size of the vector input to the outer-product block 74 is twenty-four, while the size of the vector output of block 75 is 324.

We have found that, after a certain point, increases in the length of the vector input to the outer-product step cause the accuracy of the development system to improve but the accuracy of the product system to deteriorate. The reason for this is that increasing the size of the outer product causes the development system to model more closely the characteristics of the speech contained in the data base that the development system uses for "training." When the size of the outer product greatly increases, the characteristics of the individual phonemes of the speech in the database employed by the development system are modeled with great accuracy. However, due to variations between speakers and to variations within the speech of a single speaker, the characteristics of the individual phonemes of the speech applied to the product system are almost certainly not those in the development database. The great number of parameters that are used by the modeling process to recognize patterns in speech are specific to the development-system database but do not generalize to new speech. The accuracy of the product system therefore deteriorates after the number of parameters exceeds a certain size. The size of the vector input to the outer-product block 74 has been chosen with this consideration in mind to form the best compromise.

Block 76 represents normalization of the resulting vector $u_n$. This normalization involves removal of the mean of the elements of the individual vector $u_n$ and division by the average of their absolute values. The effect is, roughly, to make loud speech and soft speech look the same; for purposes of phoneme identification, the loudness of the speech carries no information. The choice of the average of the absolute values for vector-by-vector normalization is not critical. Indeed, we intend to replace that average with the vector elements' standard deviation in some embodiments.

At this point in the process the data could enter the modeling process directly; in fact, we have operated embodiments in which they do. But we have found that greater accuracy can be achieved if a further degree of nonlinearity is added by again taking the outer product. The next computation of an outer product yields third- and fourth-order terms, since its result consists of pairs of products of linear and second-order terms. The second outer-product step must be applied with some care, since with a straightforward application the geometric growth of the output vector size would seriously degrade the accuracy of the product system.

FIG. 6B depicts steps associated with formation of the further outer product. There is ordinarily some correlation among the elements of vector $v_n$; that is, on a statistical basis, a better-than-random prediction of the value of a given element of vector $v_n$ can be made if the values of other elements are known. But mathematical modeling is more effective if it is performed on uncorrelated data. As will be described below in the discussion of the development system, the development system processes a development data base to generate a decorrelation matrix D that will transform $v_n$ into a new vector $w_n$ whose elements are not correlated with each other.

The particular decorrelation matrix D that we employ in block 78 is one that resolves the vector $v_n$ into eigenvectors of a covariance matrix generated from the data in the development data base; that is, each element of $w_n$ represents the component of $v_n$ that lies in the direction of a different eigenvector. We believe that the elements of $w_n$ associated with the highest eigenvalues are those of most importance to phoneme recognition, while the elements associated with the lowest eigenvalues are the least important.

In a step represented by block 80, we select only the twenty elements of $w_n$ that are associated with the twenty highest eigenvalues calculated by the development system—i.e., we select only the twenty "most-important" elements of $w_n$—and we form the outer product $z_n$ of these twenty elements, as block 82 indicates. Meanwhile, in a step represented by block 84, a 170-element vector $x_n$ is formed from $w_n$ by discarding the elements associated with the 154 lowest eigenvalues, and $x_n$ is concatenated with $z_n$ to form a new, 380-element vector $a_n$, as block 86 indicates. Thus, we introduce extra nonlinearity, but by judicious selection of vector elements we do so without lengthening the resultant vector unduly.

In FIG. 6C, block 88 represents decorrelation and modeling directed to a particular phoneme, namely, the "h" sound. Mathematically, this step consists of scalar multiplication of the $a_n$ vector by a single vector $K^{h''}$. $K^{h''}$ consists of a plurality of elements, one corresponding to each of the elements of the vector $a_n$. Each element of $K^{h''}$ represents the degree to which the corresponding element of $a_n$ is characteristic of the "h" phoneme. $K^{h''}$ is produced during the training process from a decorrelation matrix and a "kernel" vector, and the multiplication of $a_n$ by $K^{h''}$ is mathematically equivalent to initial multiplication of $a_n$ by the decorrelation matrix followed by scalar multiplication of the resultant decorrelated vector by the kernel.

As was mentioned above, much of the benefit of the nonlinear modeling can be obtained without the second series of outer-product steps represented by blocks 80-86 of FIG. 6B. In such a simplified system, the decorrelation matrix used to form $K^{h''}$ is the same as the matrix D depicted in block 78, so a separate decorrelation step 78 is not required, and the output of block 76 goes directly to block 88.

The scalar $X_n^h$ that results from the step represented by block 88 is related to the likelihood that the sound that caused the vector $a_n$ was an "h" sound. Block 90 represents the conversion of $X_n^h$ into a "likelihood ratio," which is a quantity more directly representative of this likelihood. In searching through candidate words or phrases, the word/phrase determiner 14 (FIG. 1) in effect multiplies the likelihood ratios of the component phonemes of a candidate word or phrase to arrive at a probability for that word or phrase. To make the computation simpler, the step represented by block 90 computes the logarithm $Y_n^h$ of the likelihood ratio and supplies $Y_n^h$ to the word/phrase determiner 14, which then "multiplies" by addition. It is this logarithm that we have taken to calling an "estimate."

$Y_n^h$ is computed as the value of a polynomial in $X_n^h$ whose constants are produced during the development process and are characteristic of the sound "h." Specifically, the polynomial constants have the values stated in block 90 in terms of (1) the means (mu) and standard deviations (sigma), labeled with subscript zero, of $X_n^h$ values in the development ("training") speech data resulting from extracted receptive fields that do not contain the "h" phoneme and (2) the means and standard deviations, labeled with subscript 1, of the $X_n^h$ values in the development speech data resulting from extracted receptive fields that do contain the "h" phoneme.

The processing for vowels and for final consonants is essentially the same as that depicted in FIGS. 6A–C for initial consonants. Aside from the differences in receptive-field extraction, the processing for vowels and final consonants differs from that for initial consonants in two ways. First, there are differences in the parameters employed in blocks 72 and 78 for the fixed-parameter normalization and the decorrelation because those parameters are generated from the vowel and final-consonant subsets of the data base rather than from the initial-consonant subsets. The second is that the element choices represented by blocks 80 and 84 differ for reasons that will become apparent in the discussion of the development system.

From the outputs of block 90 and corresponding blocks for other phonemes, the word/phrase determiner 14 performs a search routine to find the words and phrases that were likely spoken. As was indicated before, we will not describe the operation of the word/phrase determiner 14 in detail, since the present invention is directed to identification of the phonemes. Thus, the description of the product system is now complete.

Development System: Overview

We now turn to the ways in which one arrives at the various parameters used in the product system illustrated in FIGS 1–6. The product system of FIGS. 1–6 operates on unknown speech using previously determined normalization vectors and decorrelation and modeling matrices to determine the phonemes that it contains. The development system of FIGS. 7–11 operates on known speech and the associated phonemes so as to calculate the decorrelation and modeling matrices.

Calculation of Trigger-Generation Matrices

Figure 7A:
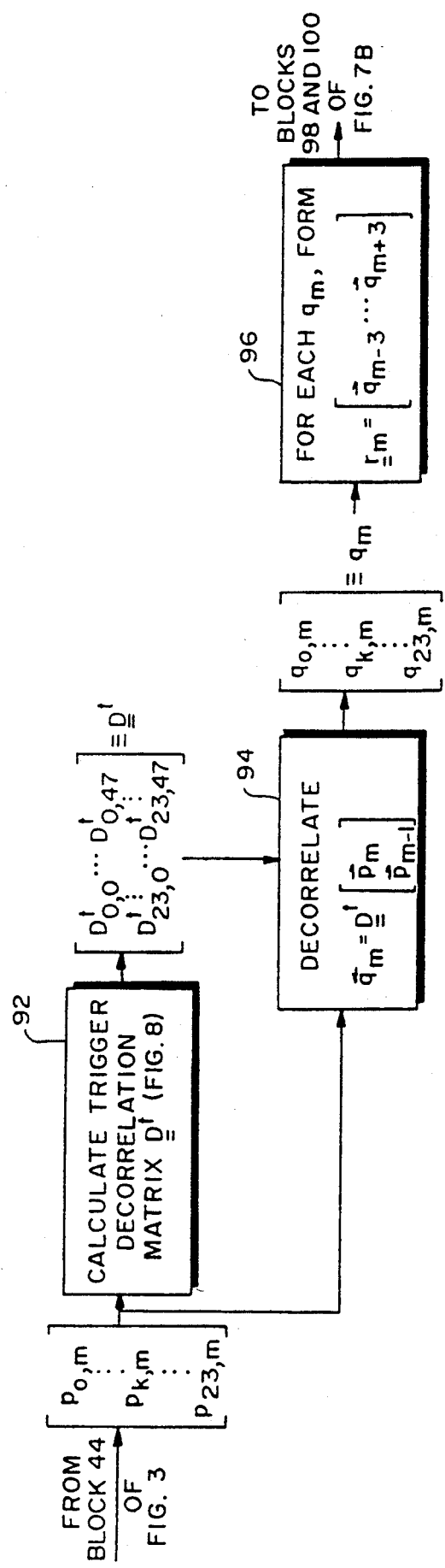
Figure 7B:
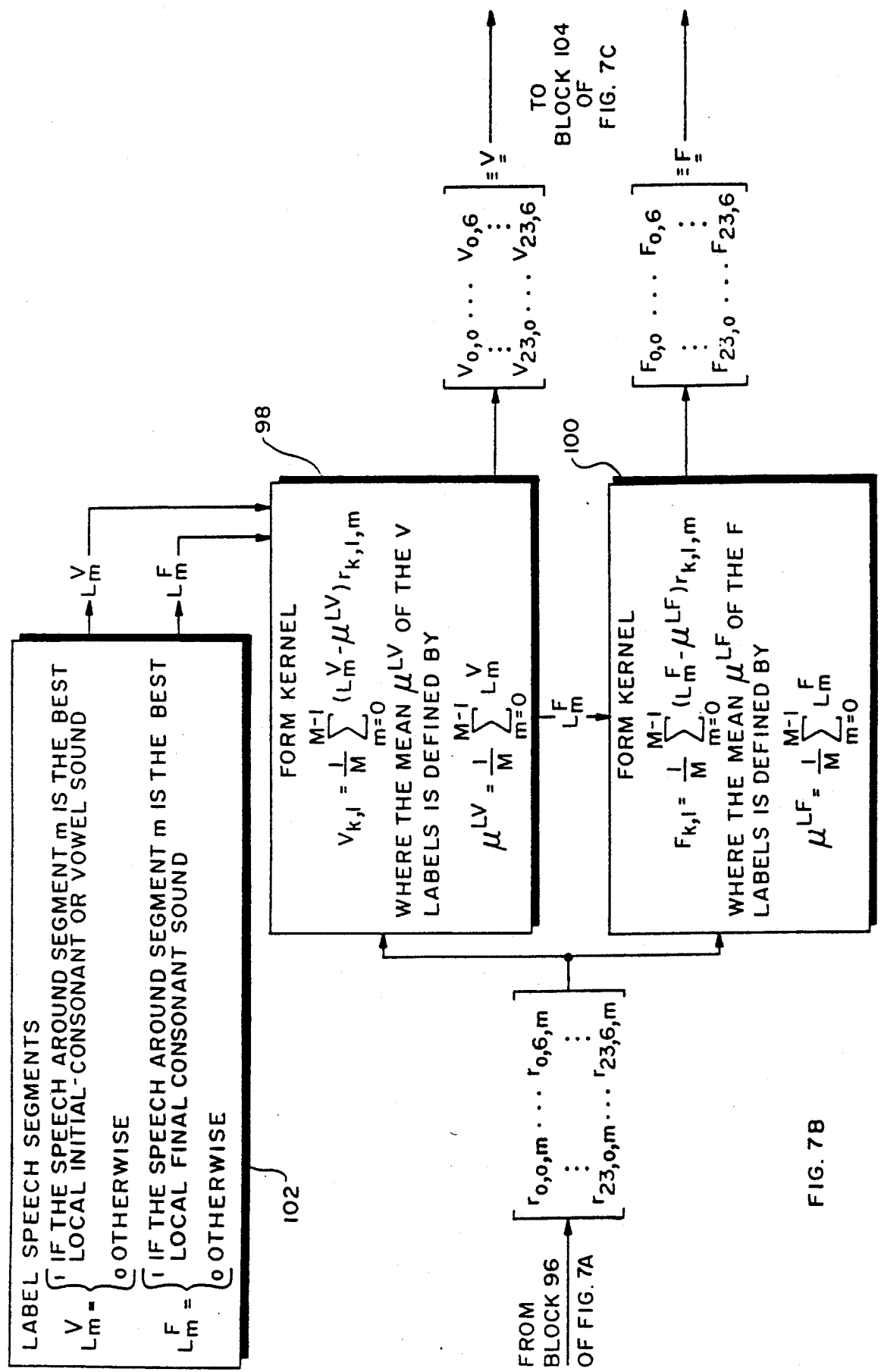

FIGS. 7A, 7B, 7C, and 7D depict a part of the development-system apparatus for calculating the V" and F" trigger matrices, which are used in the step represented by block 46 of FIG. 4 to generate the V and F triggers. The development system takes a large data base of known speech and subjects it to preprocessing identical to that depicted in FIG. 3. The output of this preprocessing is a series of M twenty-four-element vectors $p_m$. The purpose of the process depicted in FIGS. 7A and 7B is to arrive at a mathematical model of the human "system" of phoneme recognition so as to produce a matrix whose scalar multiplication by a sequence of $p_m$'s produces a scalar ($q_m$ or $r_m$ in FIG. 4) that is indicative of the likelihood that a phoneme of the given class occurred.

There is in general a correlation between elements of the vectors $p_m$. As was mentioned above, however, the best model results if the elements of the inputs are uncorrelated. Therefore, instead of using the raw $p_m$'s, the apparatus of FIG. 7A calculates a trigger decorrelation matrix $D^t$, as block 92 indicates, that transforms the $p_m$'s into new vectors $q_m$ whose elements have no correlation with each other or with the elements of the previous vector $q_{m-1}$ in the sequence. Block 94 represents the operation of decorrelating by multiplying the decorrelation matrix $D^t$ by a forty-eight-element vector consisting of the concatenation of $p_m$ and $p_{m-1}$. (Note that the step of block 92 must be performed on all of the development data before the step of block 94 can be performed on any of those data.) The result is a twenty-four-element vector $q_m$.

The next three blocks represent the heart of correlating the system input with the system output to arrive at the best linear model. Block 96 forms seven-vector sequences of $q_m$'s into matrices $r_m$, which constitute the input to the system, or at least a decorrelated version of the input. This input is applied in two parallel kernel-formation steps represented by blocks 98 and 100 of FIG. 7B. It is in these kernel-formation steps that the input $r_m$ is correlated with the output, which consists of labels $L_m^V$ and $L_m^F$ produced in the step represented by block 102. In this step, a trained human listener listens to the speech from which each vector $p_m$ was produced and labels it with an indication of whether or not that speech contained a vowel or initial consonant. The listener also supplies a label to indicate whether that speech contained a final consonant or not. The result is a sequence of values $L_m^V$ and $L_m^F$. As block 102 indicates, each of these values is either a 1 or a 0, depending on whether a phoneme of the particular type was contained in the associated speech. These values are the output of the system to be modeled, and the kernel-formation steps represented by blocks 98 and 100 correlate these outputs with the inputs $r_m$.

Specifically, block 98 represents formation of a matrix V having one element for each element in the 24×7 matrix $r_m$. To generate a given element of matrix V, the corresponding element in each input matrix $r_m$ is multiplied by a quantity consisting of the difference between the label $L_m^V$ for that vector and the mean of the $L_m^V$'s. The resultant values are added for all of the development data and divided by the total number of input vectors, and the result is the value $V_{k,1}$ for the kernel. The kernel F is similarly produced, but the output used to produce the F kernel is $L_m^F$ rather than $L_m^V$.

The subtraction of the means maximizes the numerical range within which the linear part of the kernel can be expressed, and the resultant change in the outputs V and F of the modeling process presents no problem since the threshold employed in block 48 of FIG. 4 is set to accommodate the removal of the mean.

The use of the same matrix to produce a common trigger for both the initial-consonant and the vowel phonemes results from early studies in which the use of separate matrices was initially envisioned. Inspection of the matrices used for the two triggers revealed that they were essentially the same but were displaced in time. We therefore concluded that, with an appropriate time displacement, we could use a single trigger matrix for both triggers and thereby eliminate some computational burden.

Figure 7C:
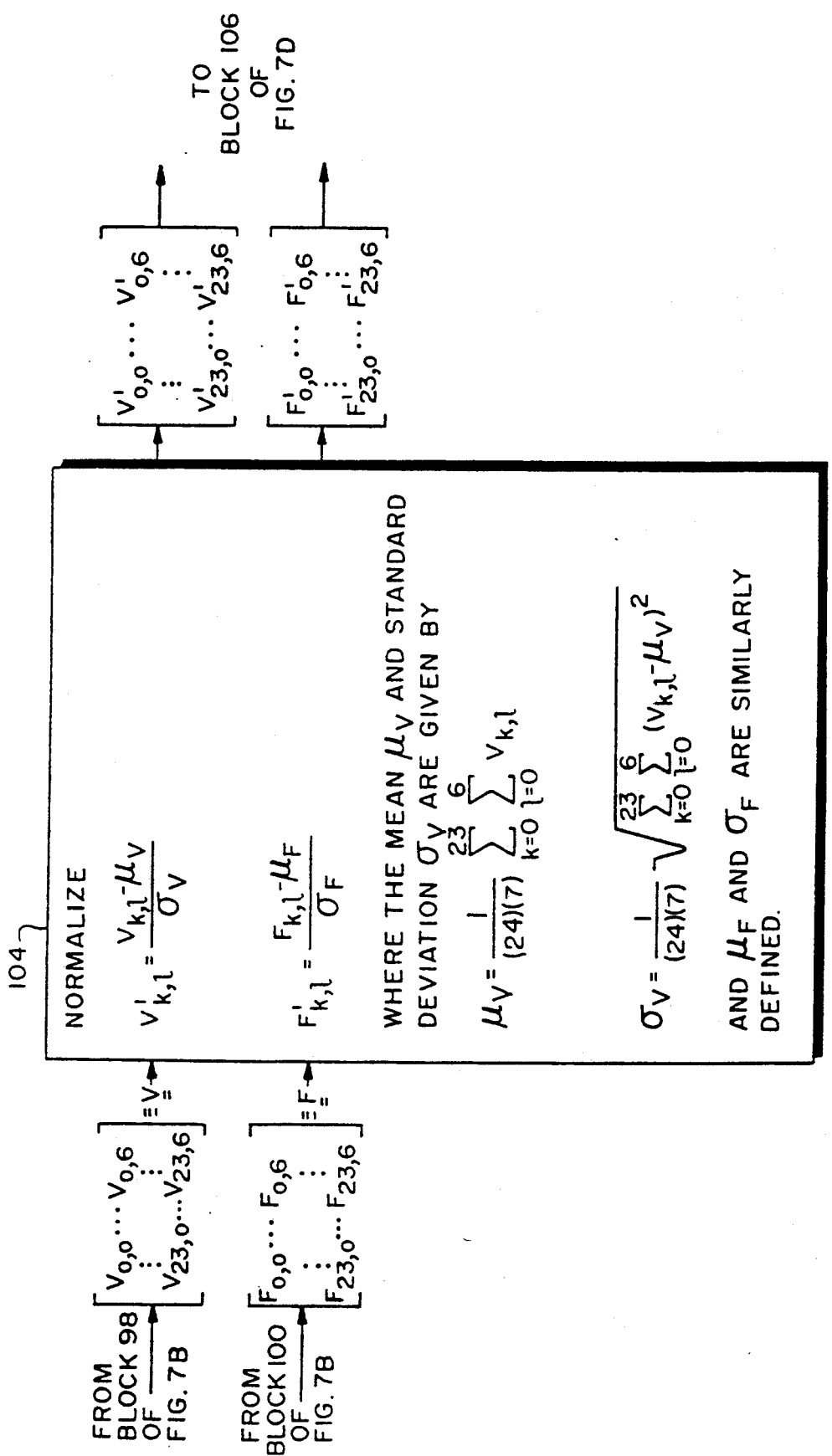

Block 104 of FIG. 7C represents normalizing the V and F kernels by subtracting from each kernel element the mean of all the elements of the kernel to which that element belongs and dividing the results for each kernel by the standard deviation of the elements of that kernel. This kernel normalization is not necessary, but it has been included because of numerical considerations. The means of the kernels should already be small since the means of both the inputs and the outputs used in the kernel-formation steps are zero or nearly zero themselves. The means of the inputs are nearly zero because of the removal of the moving average in block 44 of FIG. 3; the width of the window of the moving average is nearly twice the time width of the kernels. The outputs are made zero, as we discussed above, by removing the means of the labels when the kernels are formed.

The matrices $V'$ and $F'$ that result from the normalization of block 104 are then combined with the decorrelation matrix $D^t$, as block 106 of FIG. 7D indicates, to produce two new modeling matrices $V''$ and $F''$.

The resultant matrices $V''$ and $F''$ are used in the step represented by block 46 of FIG. 4 to perform two functions simultaneously. The first function is the transformation of the $p_m$'s into the uncorrelated vectors $q_m$ of FIG. 7A upon which the development modeling was performed. The second is to model the resultant uncorrelated vector with the normalized kernels $V'$ and $F'$ to generate the indications of whether phonemes of the indicated types have occurred. As a result, although the kernel-formation steps 98 and 100 of FIG. 7B are performed on sequences of only seven uncorrelated vectors, the modeling step 46 of FIG. 4 is performed on sequences of eight $p_m$'s because each of the seven decorrelated vectors is calculated from not only the corresponding correlated vector but also from the preceding correlated vector. For this reason, the V's and F's that serve as the input to step 106 are $24 \times 7$ matrices while the corresponding outputs of step 106 are $24 \times 8$ matrices.

It can now be appreciated why we defined the delay of block 46 of FIG. 4 to be three. That block represents the step of generating the outputs $q_m$ and $r_m$ by scalar multiplying the trigger matrices by a sequence of input vectors $p_{m-7} \ldots p_m$. This step implicitly generates a L decorrelated version of the sequence $p_{m-6} \ldots p_m$ and models this decorrelated sequence. Since this decorrelated sequence is centered on $p_{m-3}$, the delay of step 46 is considered to be three.

The calculation of the decorrelation matrix, represented by block 92 of FIG. 7A, is depicted in more detail in FIG. 8. In FIG. 8A, block 108 represents the calculation of a set of covariances. For each vector $p_m$ in the development data, the covariance between each of the twenty-four elements of $p_m$ and each of the other elements of $p_m$ is calculated, as is the covariance between each element of $p_m$ and each of the elements of the preceding vector $p_{m-1}$. These covariances are used in a vector equation, depicted in block 110 of FIG. 8B, to determine the best prediction of the value of the 1th element of $p_m$ based on all of the elements of the preceding vector $p_{m-1}$ and on all of the lower-index elements of the same vector $p_m$. The vector a consists of coefficients for the best prediction of the 1th element of $p_m$ based on all the elements of $p_{m-1}$ and all of the lower-indexed elements of $p_m$. That is, if $p_{1-1,m}$ and all of the lower-indexed elements of $p_m$ are concatenated with $p_{m-1}$ to form a new vector, the scalar product of $a_1$ and the new vector is the best prediction of $p_{1,m}$.

Figure 8A:
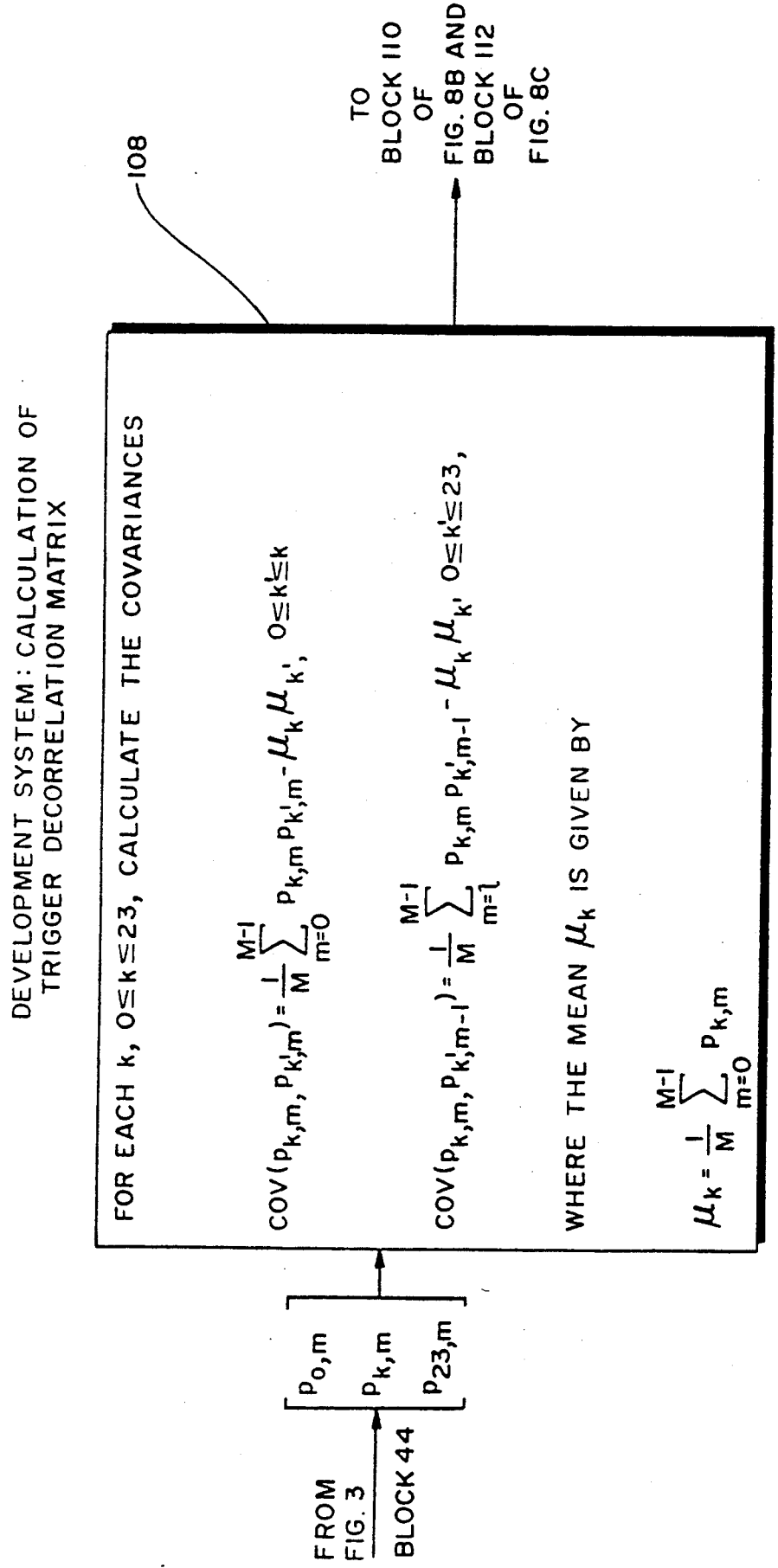
FIGS. 8A, 8B, 8C, and 8D together constitute a block diagram depicting the decorrelation-matrix calculation of FIG. 7A in more detail.
Figure 8B:
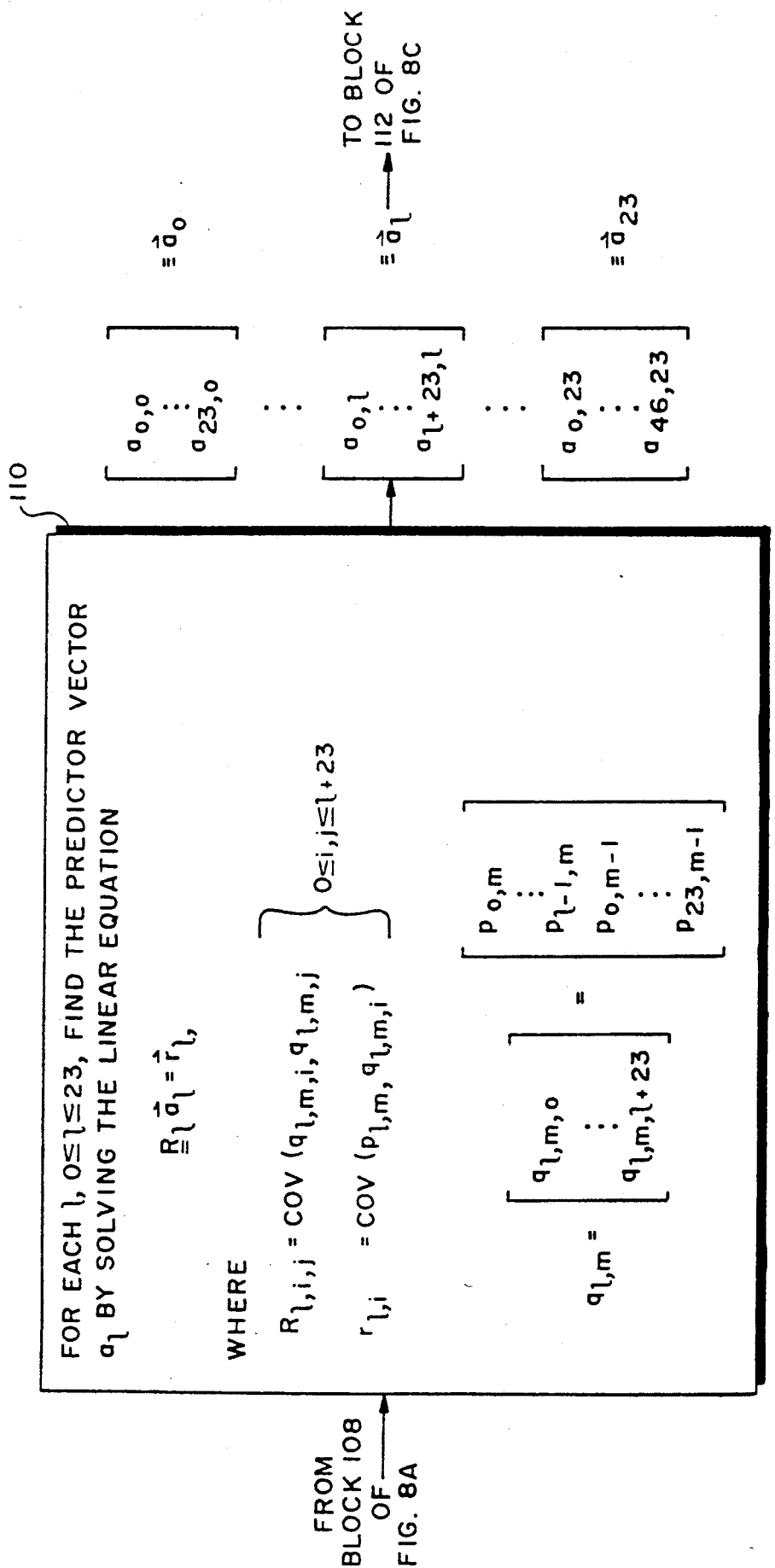
Figure 8C:
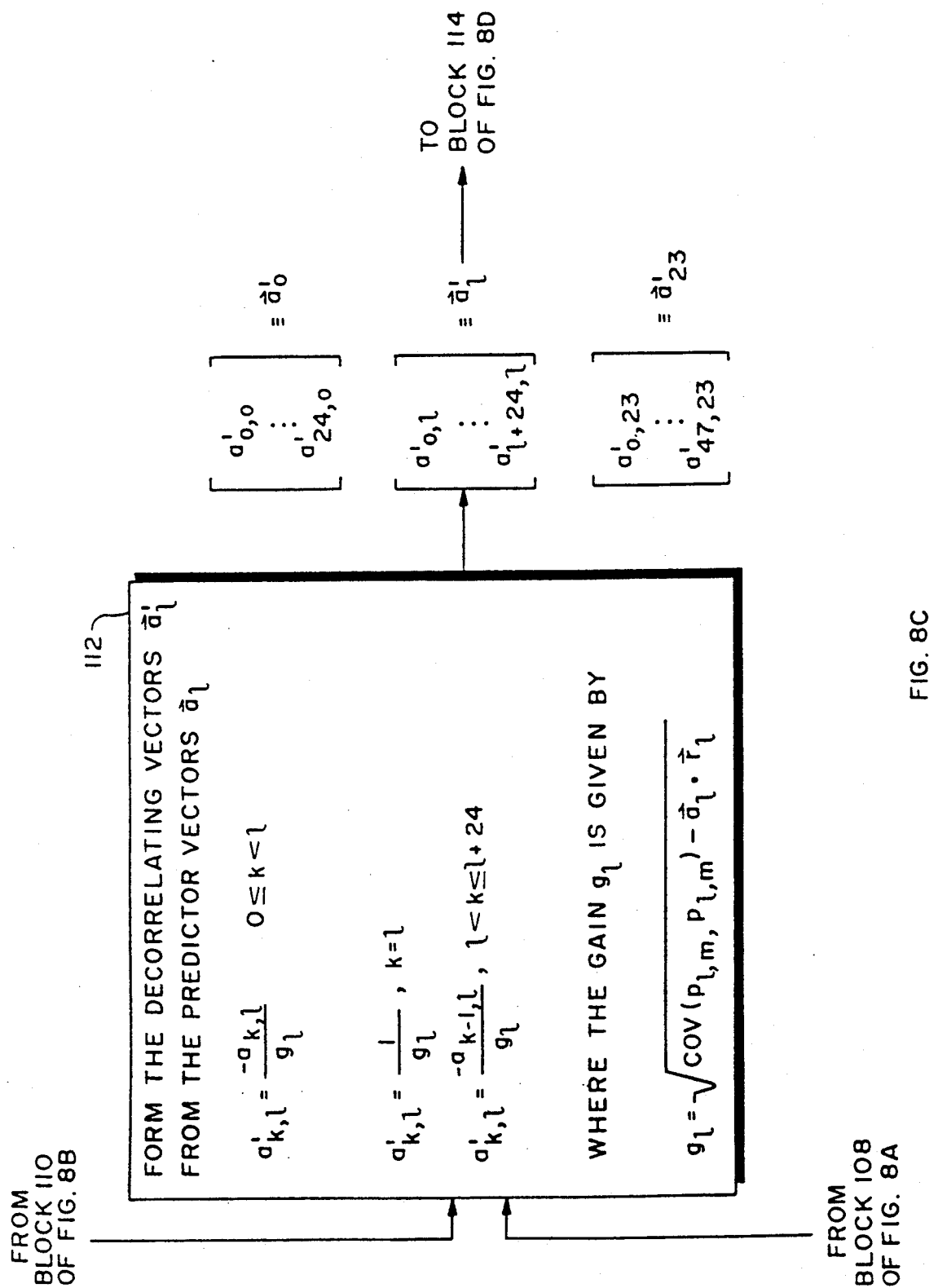
Figure 8D:
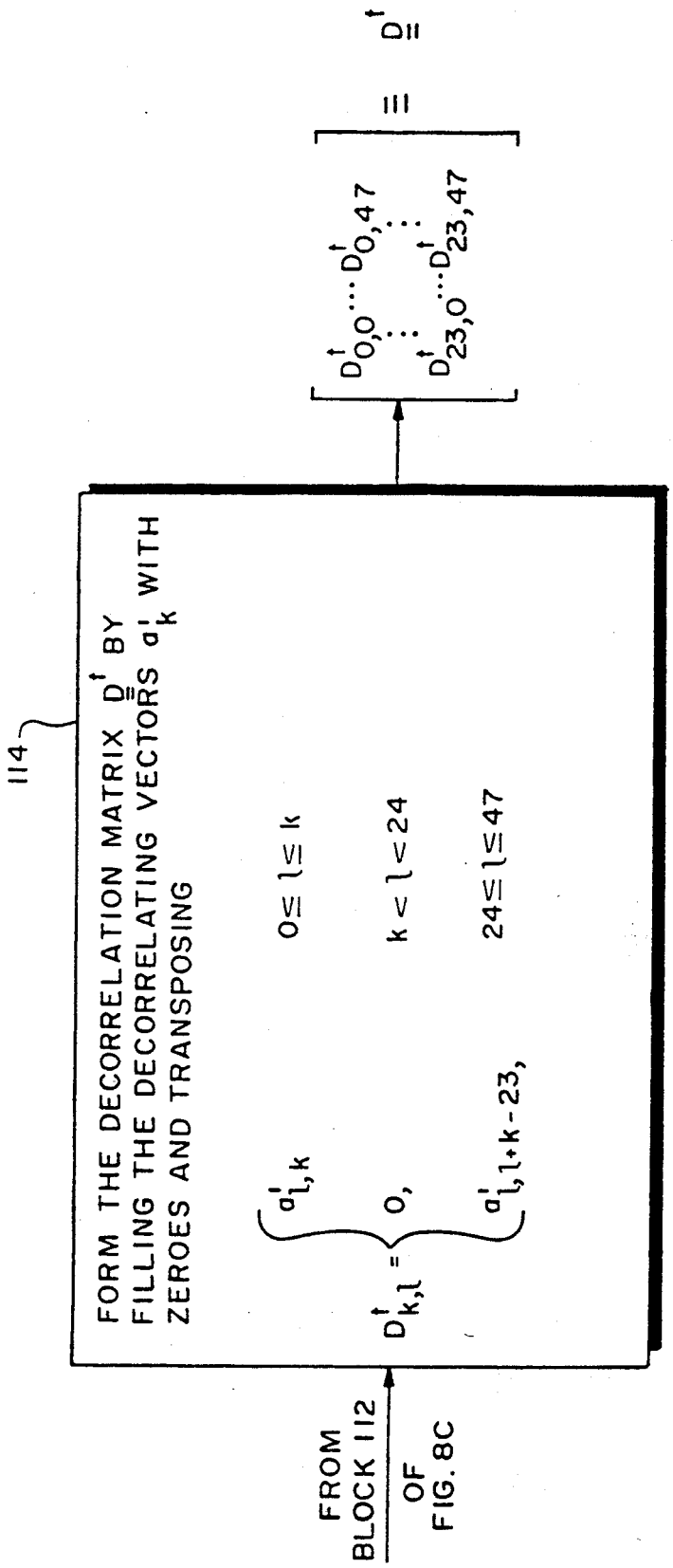

A decorrelating vector is one that, when scalar multiplied by a vector consisting of the concatenation of $p_{m-1}$ with $p_{1,m}$ and all of the lower-indexed elements of $p_m$, produces a value proportional to the difference between $p_{1,m}$ and the best prediction of $p_{1,m}$. The step represented by block 112 of FIG. 8C changes each prediction vector $a_1$, which is $1+24$ elements long into a decorrelating vector $a'_1$, which is $1+25$ elements long, in accordance with the equations depicted in that block, which include division by a gain term $g_1$. Each of the decorrelating vectors $a'_1$ produces one element of a decorrelated vector when it is multiplied by a subset of the elements in the concatenation of the correlated vectors $p_m$ and $p_{m-1}$. Block 114 of FIG. 8D represents lengthening each decorrelating vector $a'_1$ with zero elements to produce a new vector that gives the same element when multiplied by the concatenation of all of $p_m$ and $p_{m-1}$. The lengthened vectors are then transposed to form the trigger decorrelation matrix $D^t$. Because of division by the gain $g_1$ depicted in block 112, the use of the decorrelation matrix $D^t$ in block 94 of FIG. 7A yields an output vector $q_m$ whose elements all have unity variance through time. The kernel-formation steps, blocks 98 and 100 of FIG. 7B, depend upon the variances' being unity.

Calculation of Decorrelation and Modeling Matrices

Figure 9:
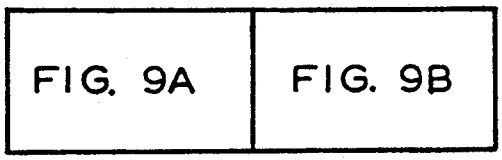
FIG. 9 is a diagram depicting the spatial relationship between FIGS. 9A and 9B.
Figure 11:
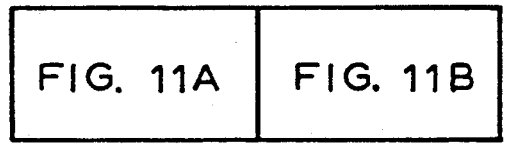
FIG. 11 is a diagram depicting the spatial relationship between FIGS. 11A and 11B.
Figure 10A:
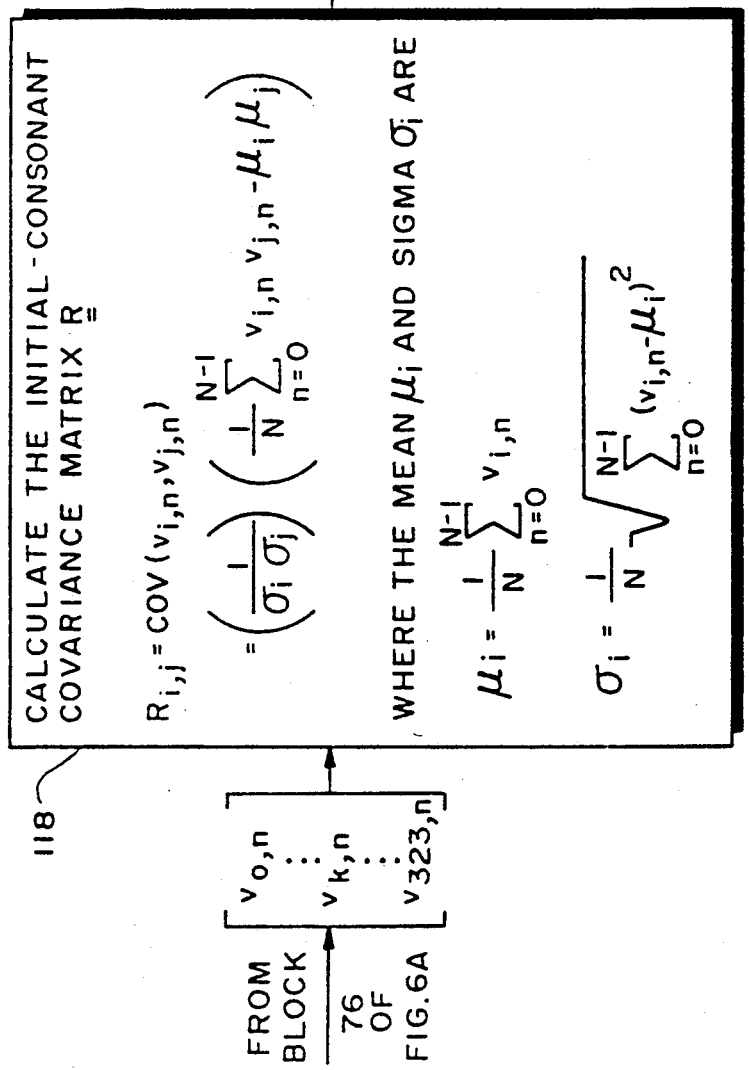
FIGS. 10A and 10B together constitute a block diagram depicting in more detail the calculation of the first initial-consonant decorrelation matrix and eigenvalues of FIG. 9A.

We now turn to FIGS. 9, 10, and 11, which depict the parts of the development system that generate the matrices for recognition of the individual phonemes such as the "h" sound. The initial stages of the processing in the development system are the same as those used in the product system; that is, the known speech is subjected to the steps, illustrated in FIGS. 5 and 6A, that are used in the product system for initial speech-element processing. Note that this processing therefore requires the previous calculation of the matrices for generating the V and F triggers; the $v_n$'s are taken from only those groups of samples identified by the V or F triggers as being "receptive fields".

We will assume for the remainder of the discussion that the matrix to be produced is that which is used to indicate whether the phoneme "h" is present. Accordingly, the $v_n$'s are those derived from the receptive fields identified by the V (initial-consonant or vowel) trigger. From these $v_n$'s, a decorrelation matrix is produced, as block 116 indicates. Since the decorrelation matrix produced by step 116 is generated from the initial-consonant receptive fields, it is in general different from the trigger decorrelation matrix used in block 92 of FIG. 7A. Steps parallel to the step represented by block 116 generate a separate vowel decorrelation matrix and a separate final-consonant decorrelation matrix, which are used, respectively, for vowel and final-consonant phonemes.

The particular processing represented by block 116 is described in more detail in FIG. 10. The matrix calculated in FIG. 10 eliminates only correlation among the individual elements in a given vector $v_n$; it differs from the FIG. 8 trigger decorrelation matrix in, among other things, that it does not eliminate any correlation between elements of $v_n$ and elements of $v_{n-1}$. The reason for this is that, unlike successive ones of the $p_m$'s decorrelated in FIG. 8, successive ones of the $v_n$'s decorrelated in FIG. 10 have no fixed time relationship between them.

Block 118 represents calculation of the covariance matrix R, whose elements are the variances and covariances among the elements of the vectors $v_n$ derived from those segments of the development data identified as receptive fields for initial consonants. Block 120 depicts a procedure for processing the covariance matrix R to find vectors $a_1$ whose functions are similar to those to be performed by the $a_1'$ vectors generated in FIG. 8. Indeed, the general approach represented by FIG. 8—with appropriate adjustments made to take into account the fact that no attempt is being made in FIG. 10 to eliminate inter-vector correlation—can be used in some embodiments in place of the method of FIG. 10. However, the method shown in FIG. 10 is depicted because the resultant decorrelation matrix resolves input vectors into eigenvector components and thus facilitates the vector-length reductions described in connection with blocks 80 and 84 of FIG. 6B.

Figure 10B:
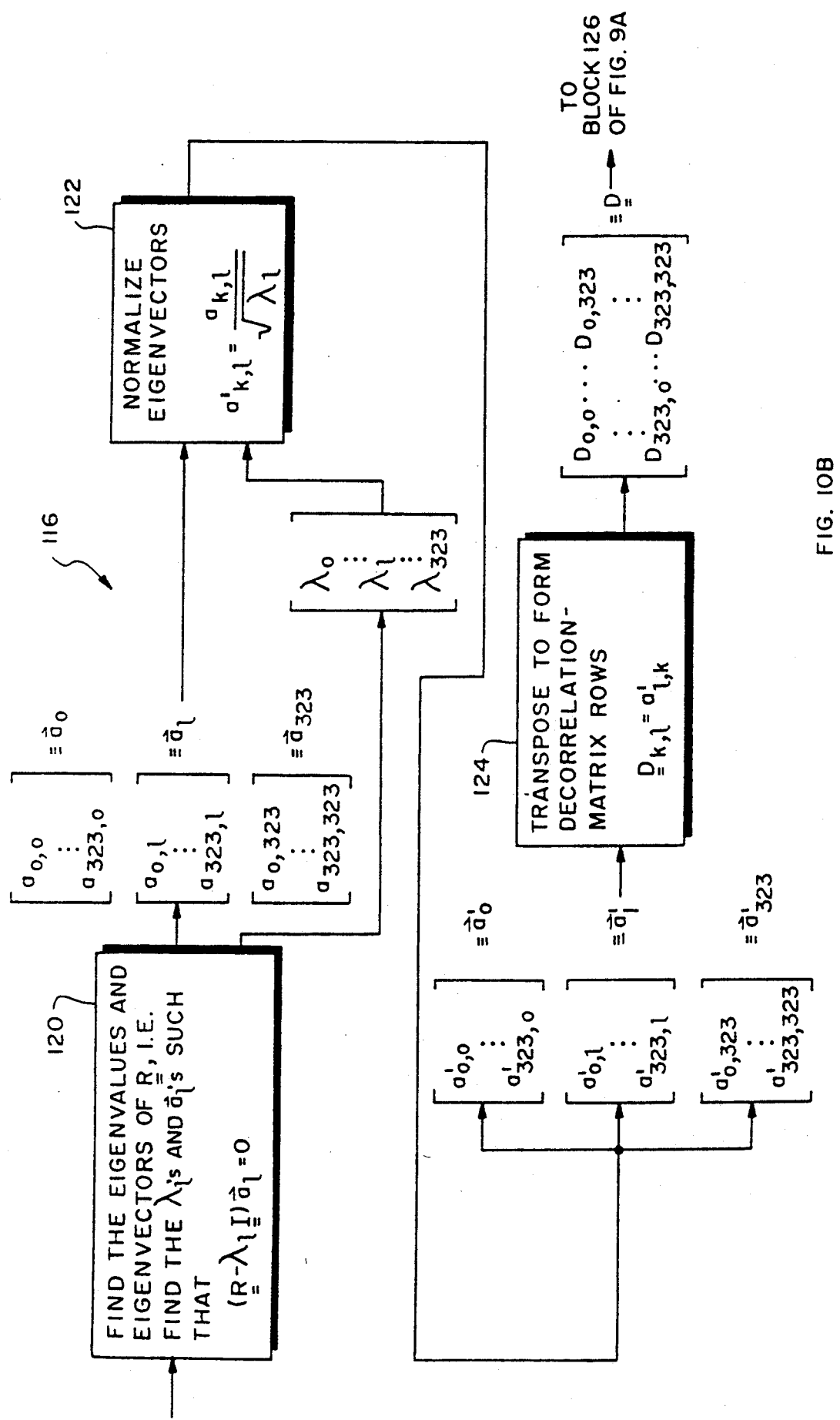

Block 120 of FIG. 10B represents the step of finding the eigenvalues and eigenvectors of the covariance matrix R. The result is 324 eigenvalues and 324 corresponding 324-element eigenvectors $a_1$. Each eigenvector is normalized by dividing it by the square root of its corresponding eigenvalue, as block 122 indicates, to produce new eigenvectors $a_1'$. Each eigenvector $a_1'$, when scalar multiplied by a $v_n$ in block 126 of FIG. 9, results in a different element of a transform $w_n$ whose elements have no correlation with each other. Furthermore, as a result of the normalization step 122 and the fact that our specific algorithm for block 120 produces eigenvectors of unity norm, the variances of the elements of $w_n$ are unity. Therefore, by transposing each $a_1$ and using it as a different row of a matrix, as block 124 depicts, one obtains a decorrelation matrix D. This matrix is used to decorrelate $v_n$, as block 126 indicates, to produce an uncorrelated vector $w_n$.

The output $w_n$ of block 126 is a 324-element vector. Each of its elements is a linear combination of the elements of the $v_n$ vector. Because of the normalization step performed in block 122 of FIG. 10B, the variances of all of these combinations are the same. In the absence of such normalization, however, the variances would be considerably different, and we have assumed that the elements whose variances would have been the smallest are of least importance in identifying speech elements.

To reduce computational burden, therefore, we remove the 154 elements produced by the eigenvectors whose eigenvalues are the smallest, as block 128 indicates; this eliminates the elements whose variances before normalization were the smallest and results in a 170-element vector $x_n$. At the same time, we select the twenty "most important" elements, as block 130 indicates, and compute their outer product. This step, depicted in block 132, indicates that the outer product of the twenty "most important" elements consists of 210 additional elements. These form a vector $z_n$, which is concatenated with $x_n$, as block 134 indicates, to form a 380-element vector $a_n$.

Although the elements of $w_n$ are uncorrelated, the elements of $a_n$ in general are not, and block 136 represents the calculation of a second initial-consonant decorrelation matrix D' from all of the $a_n$ vectors derived from the development data. This decorrelation matrix can be calculated in either of the ways described so far or, indeed, in any fashion that results in an operator that will decorrelate the input vector. With this second decorrelation matrix D' calculated, each $a_n$ is decorrelated, as block 138 indicates, to generate a new uncorrelated vector $b_n$.

The resultant vectors $b_n$ are used in a process, depicted in FIG. 11, for calculating an "h"-phoneme matrix. This is a process for modeling a system whose input is the $b_n$ vectors and whose output is corresponding labels $L_n^h$. A human observer produces the $L_n^h$'s, in a step represented by block 140, to indicate whether the speech in the nth receptive field contains the "h" phoneme. It should be noted that, in accordance with the present invention, the observer does not need to label all of the sound in the development data base in order to generate a label that indicates whether it contains the "h" sound or not. The observer has to listen to only those segments that the V trigger identifies as segments in which an initial consonant occurs. This greatly reduces the time required in the development, or "training," effort.

The term phoneme is used here in a way that is more or less standard. In a given language, two sounds are the same phoneme if the substitution of one for the other in any occurrence in that language results in no difference in the meaning of the word or phrase in which either sound is used. Similarly, two sounds are different phonemes if such a substitution does sometimes result in a different meaning. Labeling of the speech with the proper phoneme must be performed largely by a trained listener who knows the different phonemes and has been instructed in the symbolism used to identify them.

However, the labeling process represented by block 140 is not performed entirely by human beings, and to this extent our use of phoneme may be considered to differ slightly from more-standard uses of the term. The labels that we use for "phonemes" depend not only on the identity of the actual linguistic phoneme but also on its environment. For instance, we may use a symbol for a given linguistic phoneme when it is preceded immediately by a voiced consonant that is different from the symbol that we use when the same phoneme is not preceded immediately by such a consonant. In the labeling process, the human labeler typically enters only the name of the phoneme, and his marks are then automatically modified by development-system software in accordance with the phonetic environment.

The actual computation of the kernel is represented by block 142. This computation is the same in principle as that represented by blocks 98 and 100 of FIG. 7B. The apparent difference between the kernel-formation step of block 142 and those of blocks 98 and 100 is that the latter result in 24×7 matrices (multiple-column matrices), while the former results in a 380-element vector (a single-column matrix). Actually, the 24×7 matrices could be considered 168-element vectors for purposes of the scalar multiplication in which they are used; the matrix representation is merely a more convenient indication of the origins of the constituent elements.

Figure 11B:
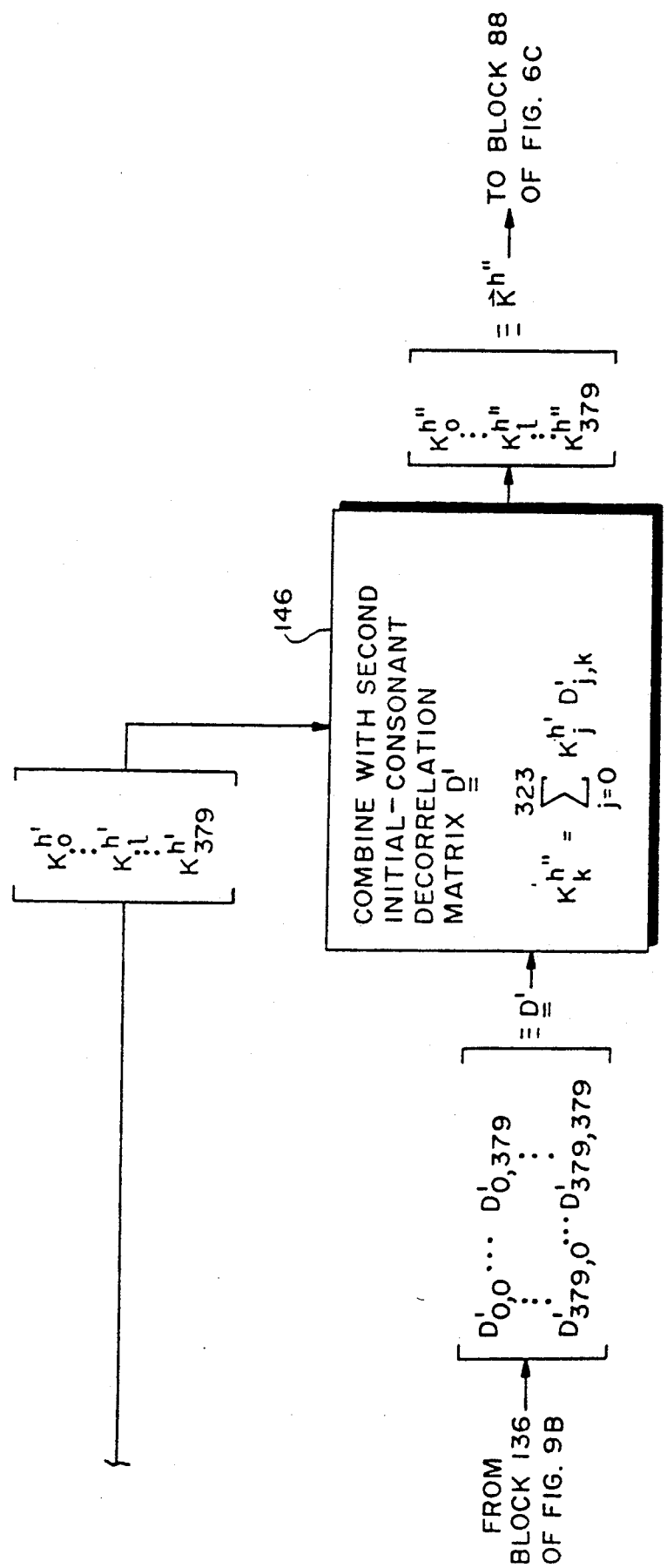

Block 144 of FIG. 11A represents normalization equivalent to the normalization performed in block 104 of FIG. 7C, and a combination step represented by block 146 of FIG. 11B is equivalent in result to the step represented by block 106 of FIG. 7D. Specifically, this step yields a matrix that simultaneously performs the two functions of decorrelation and modeling. The result is the 380-element vector $K^{h''}$ used in the step represented by block 88 of FIG. 6C to generate an indication of the likelihood that the vector being modeled was derived from speech containing the "h" phoneme.

Automatic Adjustments on Labeling

We have thus far described the essential procedures used in the development, or "training," of the phoneme-identification system and of its operation after training. It should be noted, however, that the labeling process, in which a human listener labels segments of speech to indicate the occurrence of a particular phoneme, is subject to some judgment on the part of the listener. Of particular importance here is the judgment as to when a phoneme occurs. That is, in some cases the listener whose speech-recognition process is being modeled could designate one speech segment as containing the phoneme just as comfortably as he could the immediately following segment. Of course, his choice of which speech segment to label will affect the various matrices that are calculated during the training process and will, in general, have some effect on the system accuracy.

In order to optimize the operation of the system, the initial labeling performed by the human being can be adjusted to improve the results of the product system. The labeling is improved after an initial calculation of parameters by operating the resultant product system on the development data base and observing its performance. After the product system has operated on the development data, its results are examined to find those times at which the trigger missed the V or F label by only a small number of time segments. On those occurrences, the V or F labels are moved to the times indicated by the V or F triggers. This can be done automatically—i.e., a computer can move the labels whenever the timing descrepancy is below a predetermined threshold—or human intervention can be employed so that the V or F label is moved in only those instances in which the human labeler can agree that the time indicated by the V or F trigger is just as acceptable as the time initially labeled by the human being.

The result of this operation is a modified data base. That is, the raw speech used as the input is the same as that initially used for training, but the output of the human "phoneme-recognition system" has been changed. With this new data base, the training process is repeated, and the resulting product system is again operated to observe its performance. In general, the times of occurrence of the V and F triggers in the "new" product system will differ slightly from those of the last operation of the product system, and there will still be some discrepancy between the labels and the trigger timing. Accordingly, the positions of the V and F labels are again adjusted. The performance of the system can be judged in accordance with an appropriate figure of merit derived simply from the number of times the timing signals produced by the product system coincide with the human labeler's V or F labels, the number of times the V or F labels occur without an accompanying timing signal, and the number of times the timing signals occur without an accompanying V or F label. This process of adjustment continues until the figure of merit by which th system's performance is measured ceases to improve.

Typical Hardware for Product System

Figure 12:
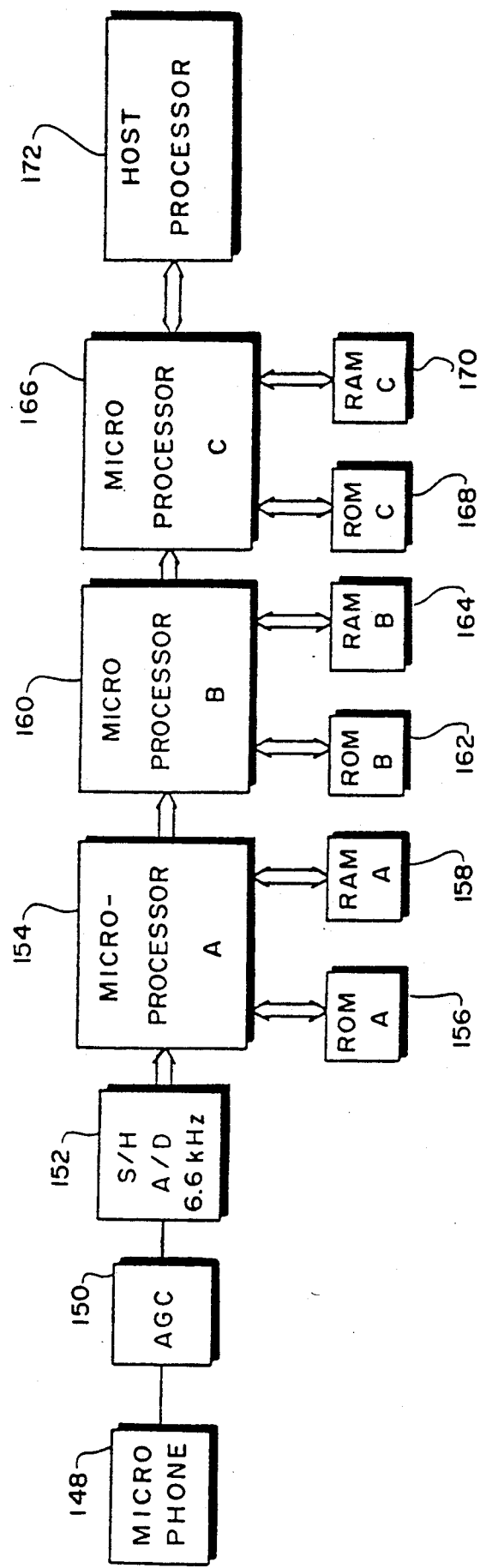
FIG. 12 is an exemplary hardware realization of the speech-recognition system described in FIGS. 1-9.

As was stated above, the illustrated embodiments are described in terms of separate functions, but many of the separate functions will typically be performed by common circuitry. FIG. 12 depicts an exemplary arrangement for performing the functions described in connection with the product system, FIGS. 1-6. In FIG. 12, a microphone 148 transforms the sound signal into an electrical signal. The microphone circuitry may optionally include circuitry 150 for automatic gain control to restrict the dynamic range of the signal. An analog-to-digital converter 152 samples the resulting analog signal and converts the samples to digital representations. It applies these digital representations to a first microprocessor 154, which preferably is of a type that is particularly applicable to signal processing. For example, a TMS 32020 microprocessor with the usual support circuitry may be used. Microprocessor 154 would be provided with a read-only memory 156 for storing its programming and a read/write memory 158 for storing intermediate results. Microprocessor 154 would perform all of the trigger generation and all of the preprocessing for phoneme recognition. The output of microprocessor 154 would thus be the trigger signals and the reduced-data representations $q_m$ from which the receptive fields are formed.

These outputs would be received by a further microprocessor 160, which would be of the same type as microprocessor 154 and which would similarly be provided with a read-only memory 162 and a read/write memory 164. The program in read-only memory 162, however, would differ from that in read-only memory 156 so that microprocessor 160 would perform the remainder of the phoneme identification; its output would be the logarithms of the likelihood ratios for the various phonemes.

A further microprocessor 166, which similarly is provided with read-only memory 168 and read/write memory 170, would typically be a general-purpose microprocessor such as one of the Motorola 68000 series microprocessors. It would perform the word/phrase determination, and it would typically communicate with a host computer 172, which would act in accordance with the results generated by microprocessor 166.

The memory requirements for such a system would depend on its specific parameters. Memories 156 and 158 might require about 14 kilobytes in total, while memories 162 and 164 would require 200 kilobytes in total. Since microprocessor 166 would require a library of words and phrases, the capacity of memories 168 and 170 would be on the order of one or two megabytes. Of course, the arrangement on FIG. 12 is merely a suggested hardware arrangement, and the teachings of the present invention could be implemented in hardware that differs greatly from that of FIG. 12.

Alternate Embodiments

Figure 13:
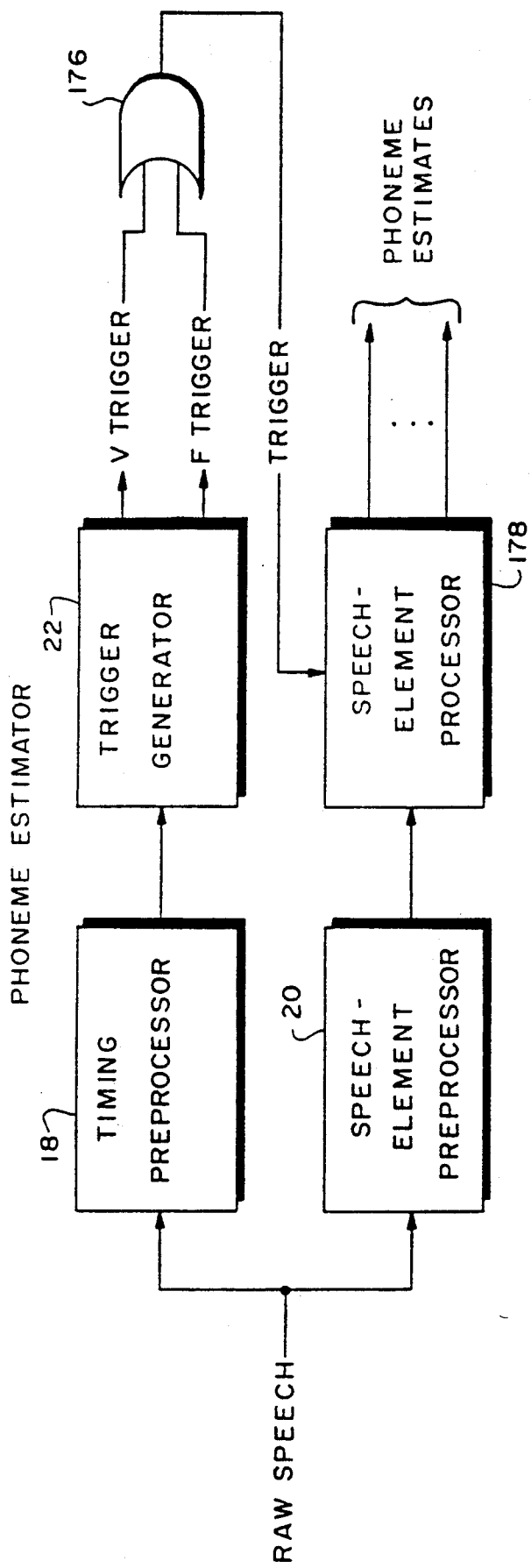
FIG. 13 is a block diagram of the phoneme estimator of an alternate embodiment of the invention.

As was stated above, the teachings of the present invention can be embodied in devices that differ significantly from the illustrated embodiment. In fact, we have obtained improved results with a device that operates all of the speech-element processors (corresponding to processors 24, 26, and 28 of FIG. 2) whenever either of the triggers occurs. That is, the circuits corresponding to the final-consonant processor 28 of FIG. 2 operate not only on the occurrence of an F trigger but also on the occurrence of a V trigger. Similarly, the circuits corresponding to the initial-consonant and vowel processors 24 and 26 operate not only on the occurrence of a V trigger but also on the occurrence of an F trigger. Thus, a block diagram corresponding to the block diagram of FIG. 2 would be simplified to take the form of the block diagram of FIG. 13.

In that drawing, the timing preprocessor 18, the speech-element preprocessor 20, and the trigger generator 22 all operate as before. However, the output of the trigger generator 22, namely, the V and F triggers, are ORed together, in an operation represented in FIG. 13 by OR gate 176, and the resultant trigger is fed to a speech-element processor 178.

Figure 14:
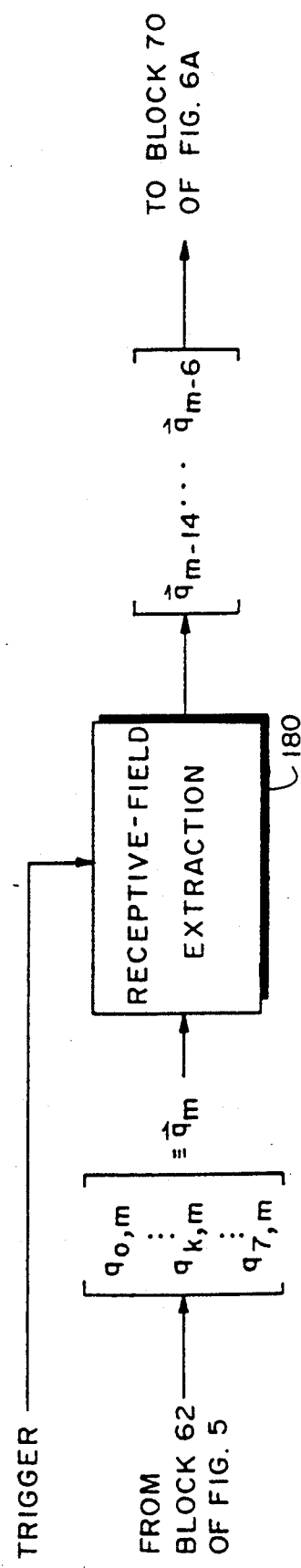
FIG. 14 s a block diagram depicting the receptive-field extraction in the alternate embodiment.

With three exceptions, speech-element processor 178 is equivalent to a combination of the three processors 24, 26, and 28 of FIG. 2. The first exception is that the processing circuits in processor 178 for all of the phonemes receive the same trigger signal; i.e., they all receive the trigger produced by OR gate 176. The second difference is that the extraction step represented by block 180 of FIG. 14 replaces the receptive-field extraction represented by blocks 64, 66, and 68 of FIG. 6A. As FIG. 14 shows, rather than using three separate receptive fields for the three classes of phonemes (namely, initial consonants, vowels, and final consonants), the embodiment of FIGS. 13 and 14 employs a single type of receptive field, consisting of vectors $q_{m-14}$ through $q_{m-6}$ for all classes of phonemes.

The third difference relates to block 78 of FIG. 6B, in which the vector $v_n$ resulting from the first non-linearization step is decorrelated with a decorrelation matrix D. In the embodiment previously described, separate decorrelation matrices were employed for the different classes of phonemes. It was thus possible that the same vector $v_n$ would have to be multiplied by three separate 104,976-element matrices in real time. In this alternate version, a single decorrelation matrix is employed for all types of phonemes, so only a single matrix multiplication is needed for any given vector $v_n$.

Figure 9A:
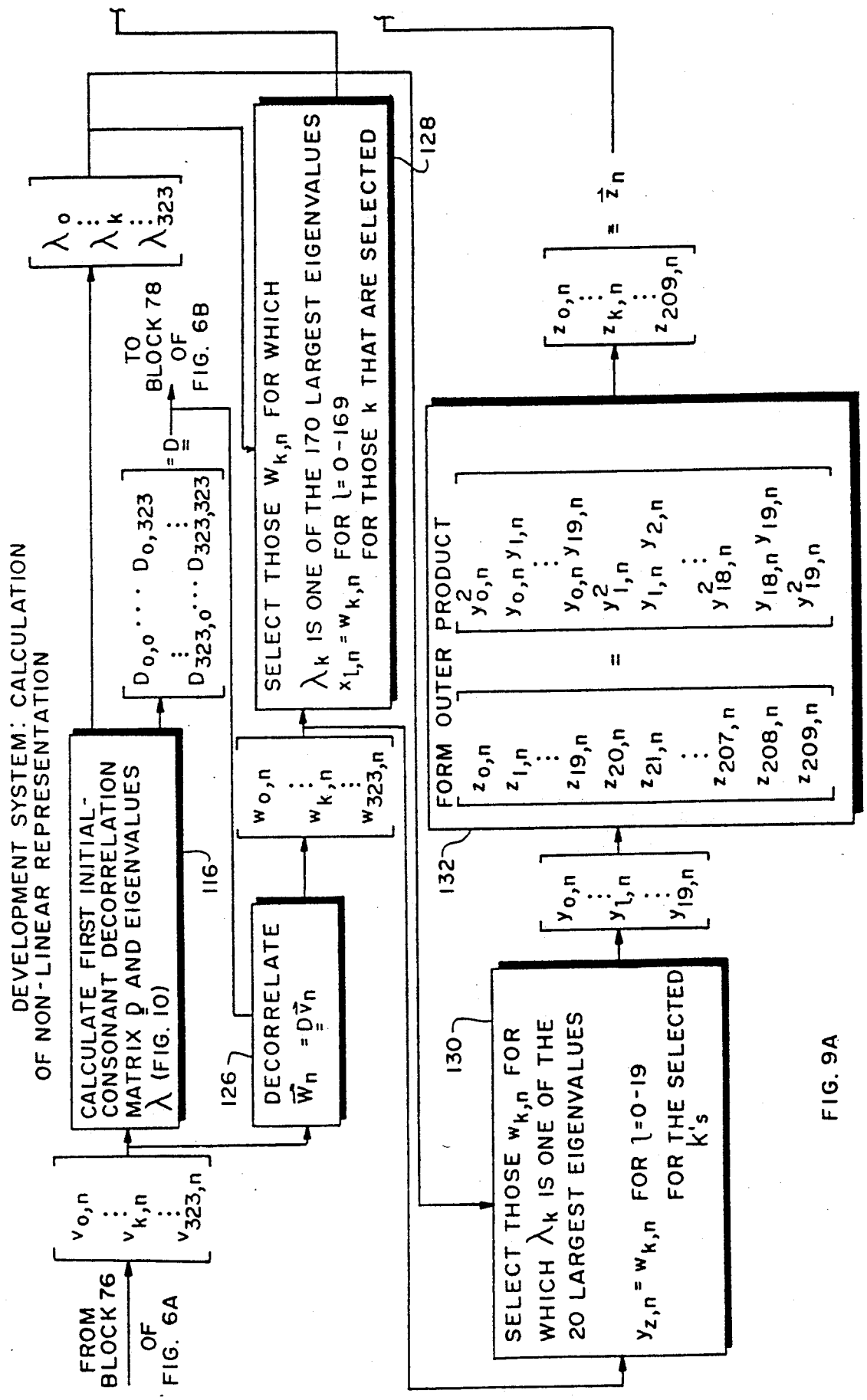
FIGS. 9A and 9B together constitute a block diagram depicting a portion of a development system for generating the decorrelation matrix employed in the speech-element processor of FIGS. 6A, 6B, and 6C and for selecting vector elements for further processing in that processor.
Figure 9B:
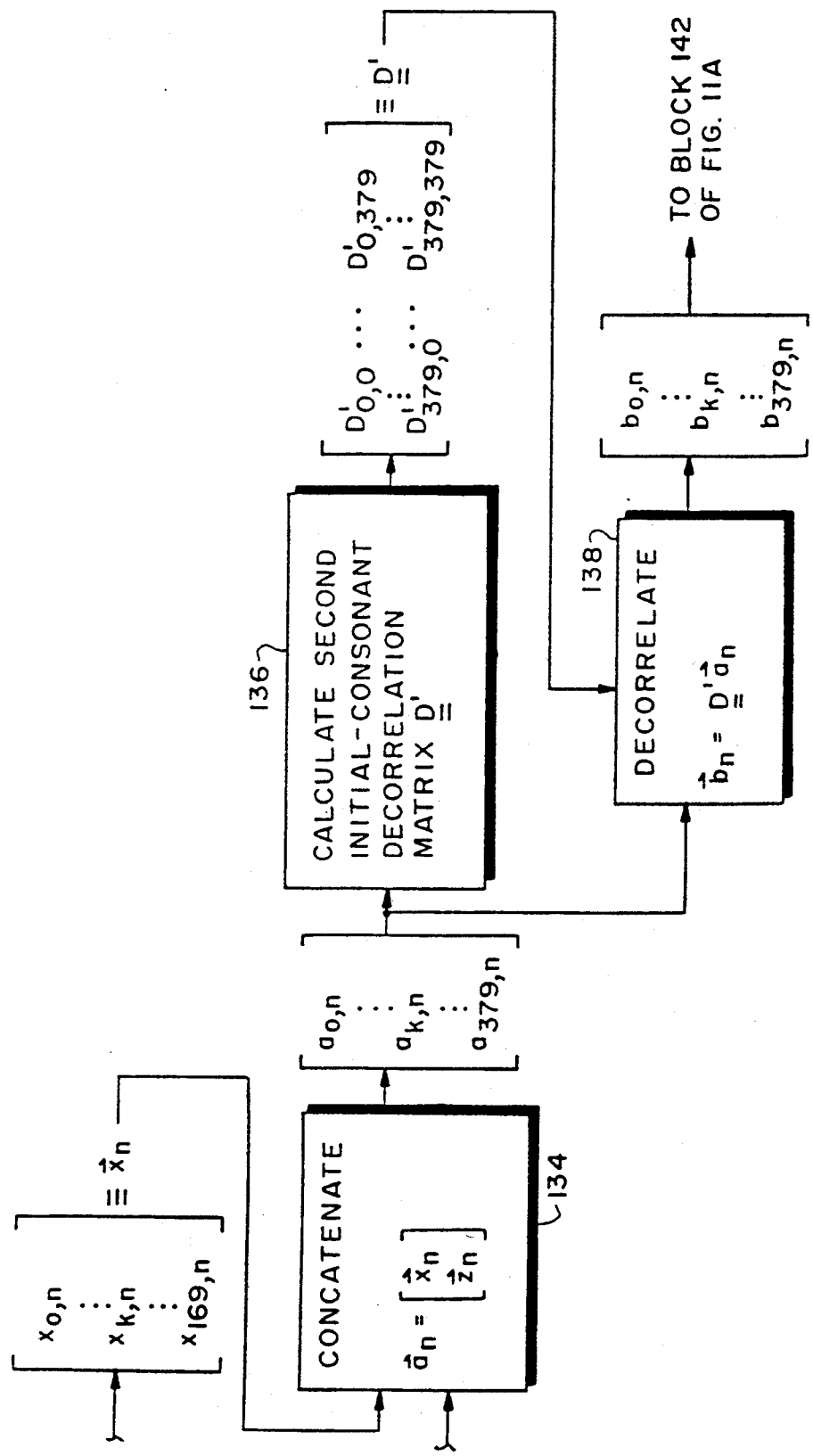

This decorrelation matrix D, like the corresponding matrix D in the first embodiment, is generated in block 116 (FIG. 9A), which represents the decorrelation-matrix calculation of the development system. The resultant decorrelation matrix differs from the corresponding matrix of the first embodiment for two reasons. The first is that the vectors $v_n$ that block 116 receives from the circuitry of FIG. 6A result, not from the receptive fields depicted in FIG. 6A, but rather from the receptive fields depicted in FIG. 14. The second reason is that block 116 in the second embodiment receives, instead of only these $v_n$'s that are identified during the labeling process as belonging to one of the three classes, all of the $v_n$'s identified during the labeling process as belonging to any of the three classes.

This altered embodiment reduces computation time because it eliminates some of the extremely computation-intensive decorrelation calculation. We have found that it additionally results in greater accuracy in the product system.

Figure 15:
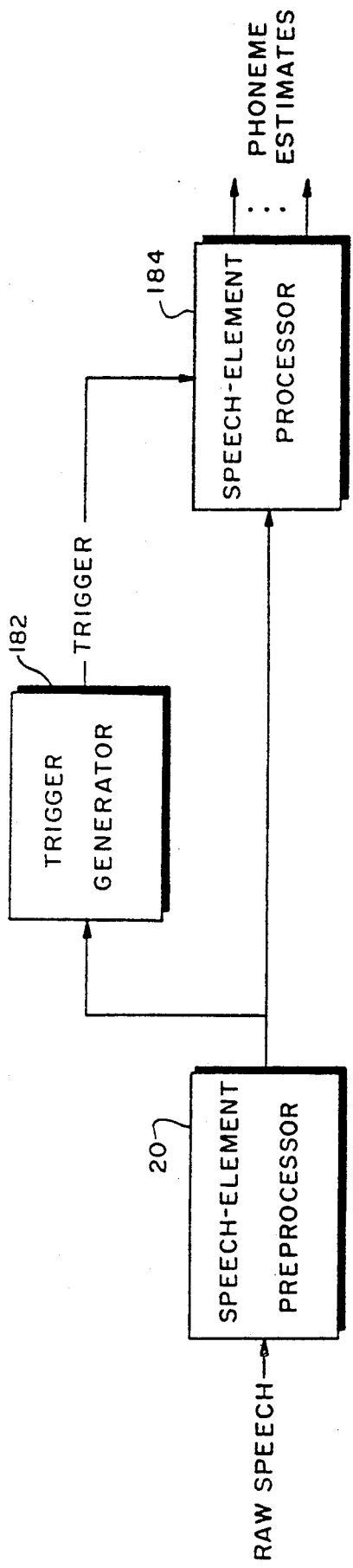
FIG. 15 is a block diagram of a further embodiment of the present invention.

FIG. 15 depicts a further simplification in the arrangement of the product system. The arrangement of FIG. 15 dispenses with the timing preprocessor; its trigger generator 182 receives instead the output of the speech-element preprocessor 20. The speech-element processor 184 of the FIG. 15 arrangement, like the speech-element processor 178 of the FIG. 13 arrangement, receives only a single trigger signal, and it assembles receptive fields in the same manner as that in which the receptive-field-extraction step of FIG. 14 does.

However, the trigger generator 182 of FIG. 15 is simpler than the previous trigger generators. Rather than modeling for broad classes of phonemes, it simply determines whether enough energy was present in a segment for that segment to contain intelligible speech.

Figure 16:
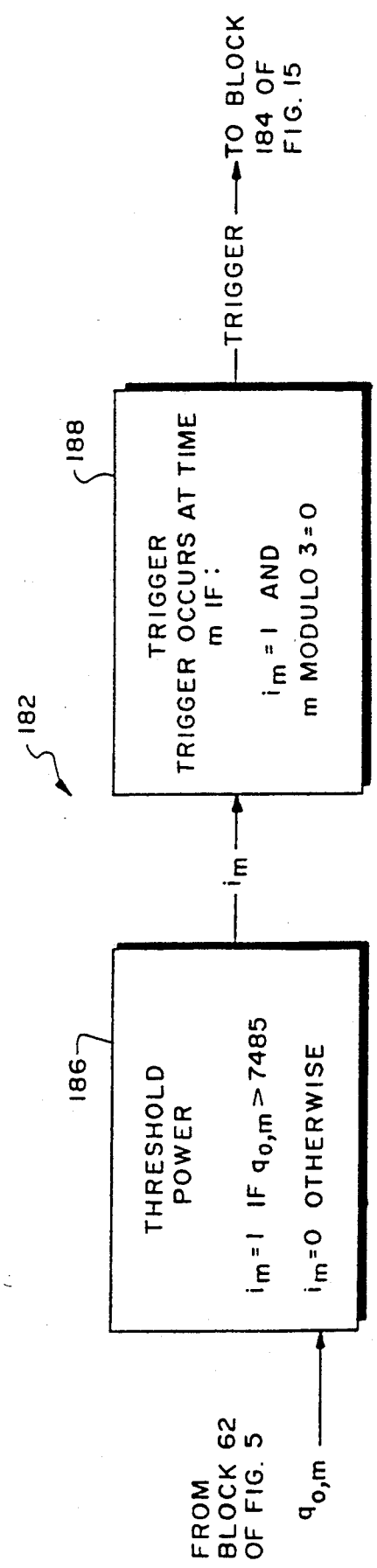
FIG. 16 is a block diagram of the trigger generator of the embodiment of FIG. 15.

As FIG. 16 illustrates, the trigger generator 182 receives the first element $q_{0,m}$ of the vector $q_m$ from the speech-element preprocessor of FIG. 5 and determines whether the first element of that vector exceeds a predetermined threshold. The first element $q_{0,m}$ is an indication of the power in the speech element, and the threshold is set to a level lower than that which results from even faint speech but higher than that of most non-speech intervals. Block 186 represents this thresholding. Block 188 represents generating a trigger on every third segment whose power exceeds the threshold. The three-segment interval is chosen because no meaningful sounds occur whose durations are shorter than three segments. The resultant trigger is then used to trigger the speech-element processor as before.

The remainder of the operation is similar to those of previous arrangements. Like the arrangement of FIGS. 13 and 14, that of FIGS. 15 and 16 uses a single decorrelation matrix in the step of block 78 of FIG. 6B, in which the vector $v_n$ resulting from the first non-linearization step is decorrelated with a decorrelation matrix D. The decorrelation matrix used for the arrangement of FIGS. 15 and 16 is somewhat different, however, since it is generated from vectors selected through the use of the energy-level trigger illustrated in FIG. 16 rather than through the use of the more-selective triggers used in other versions.

As one might imagine, the arrangement of FIGS. 15 and 16 allows more speech segments to be processed by the speech-element processor 184 than the previously described arrangements do; a simple energy-level trigger will eliminate fewer speech segments than will a trigger matrix modeled for known speech elements. Consequently, the speech-element processor 184 produces many outputs in which all of the phoneme estimates are very low. The word/phrase determiner 14 of FIG. 1 tests each output to determine whether all of the estimates are low. If so, it does not consult the word/phrase library 16 to interpret the output. In other words, the word/phrase determiner 14 screens the outputs to eliminate those that are unlikely to contain meaningful speech. Our simulations indicate that this simple type of system also gives favorable results.

From the foregoing description, it is apparent that the teachings of the present invention can be used in a variety of embodiments that differ in various respects from the embodiments described above. As was indicated above, for instance, the data-reduction sequences described in the trigger preprocessor and in the speech-element preprocessor are merely exemplary and can be replaced with other sequences designed to eliminate much of the unnecessary data while retaining information that is characteristic of the speech to be identified.

Additionally, although we have used separate modeling matrices in both embodiments to produce V and F triggers, a single matrix clearly could be used in the second embodiment. Furthermore, although we have used one or two types of triggers and one or three types of receptive fields, it may prove desirable in some embodiments to use different numbers of triggers and receptive fields.

We have illustrated the use of non-linear modeling only in connection with the speech-element processing and not in connection with the trigger processing, but it is clear that such non-linear modeling could be used for trigger processing also. Of course, the non-linear modeling that we have described is only an example of the many possible selections of non-linear elements for modeling.

It is thus apparent that the teachings of the present invention can be employed in a wide variety of devices and thus represent a significant advance in the art

What is claimed as new and desired to be secured by Letters Patent of the United States is:

1. For determining a modeling matrix to be used in identifying a predetermined speech event, the speech event being a speech element or a class of speech elements in received speech, a method comprising the steps of:
   A. dividing speech in a development base of recorded speech into speech segments and labeling the speech segments in accordance with whether the speech event occurred in the speech segment, thereby associating original labels with speech segments;
   B. computing a preliminary modeling matrix by correlating the speech segments with the original labels associated therewith;
   C. employing the preliminary matrix to associate predicted labels with the speech signal;
   D. adjusting the association of at least some of the original labels from the speech elements to which they were previously associated to nearby speech elements so that the original labels whose associations have been adjusted coincide with predicted labels; and
   E. computing a new modeling matrix by correlating the speech segments with the labels with which they are associated after adjustment.

2. A method of processing speech comprising the steps of:
   A. receiving a speech signal;
   B. converting the speech signal to a sequence of digital quantities;
   C. subjecting the digital quantities to a sequence of digital processing steps including a sequence of vector-processing steps whose outputs are multi-element vectors and whose inputs include vector outputs of previous processing steps, the sequence of vector-processing steps including a first nonlinear step, which comprises computing nonlinear combinations of different ones of its input elements to produce a first-nonlinear-step output vector that includes a separate first-nonlinear-step element representing the result of each such computed combination, and a second nonlinear step, which comprises computing nonlinear combinations of different elements of the first-nonlinear-step output vector to produce a second-nonlinear-step output vector that includes a separate second-nonlinear-step element representing the result of each such computed combination; and
   D. modeling the vector output of the sequence of vector-processing steps to generate speech-element-estimate signals that represent respective figures of merit related to the likelihoods that speech contains respective speech elements.

3. A method as defined in claim 2 wherein the modeling step comprises generating as the speech-element-estimate signals phoneme-estimate signals that represent respective figures of merit related to the likelihoods that the speech contains respective phonemes.

4. A method as defined in claim 2 wherein the vector output of the sequence of vector-processing steps that is modeled in the modeling step includes the second-nonlinear-step output vector.

5. A method as defined in claim 4 wherein the modeling step comprises generating as the speech-element-estimate signals phoneme-estimate signals that represent respective figures of merit related to the likelihoods that the speech contains respective phonemes.

6. A method as defined in claim 2 wherein the input of at least one of the nonlinear steps includes a plurality of time-interval vectors, each element of one of the time-interval vectors representing a speech time interval the same as that represented by the other elements of the same time-interval vector but different form the speech time interval represented by the elements of a different one of the time-interval vectors, at least one nonlinear step comprising computing nonlinear combinations of elements of different ones of the time-interval vectors to include in its output a separate element representing the result of each such computed combination.

7. A method as defined in claim 6 wherein the modeling step comprises generating as the speech-element-estimate signals phoneme-estimate signals that represent respective figures of merit related to the likelihoods that the speech contains respective phonemes.

8. A method as defined in claim 6 wherein the vector output of the sequence of vector-processing steps that is modeled in the modeling step includes the second-nonlinear-step output vector.

9. A method as defined in claim 8 wherein the modeling step comprises generating as the speech-element-estimate signals phoneme-estimate signals that represent respective figures of merit related to the likelihoods that the speech contains respective phonemes.

10. A method as defined in claim 6 wherein the second nonlinear step comprises computing the nonlinear combinations of different elements of the first-nonlinear-step output vector by:
    A. computing linear combinations of the first-nonlinear-step elements; and
    B. computing nonlinear combinations of different ones of the linear combinations, thereby computing nonlinear combinations of different elements of the first-nonlinear-step output vector.

11. A method as defined in claim 10 wherein:
    A. the step of computing linear combinations of the first-nonlinear-step elements comprises computing highest-variance components as the linear combinations, the highest-variance components being the components of the first-nonlinear-step input vector in the directions of the eigenvectors of the first-nonlinear-step input vector's covariance matrix that are associated with the greatest eigenvalues; and
    B. the step of computing nonlinear combinations of different ones of the linear combinations comprises computing nonlinear combinations of the highest-variance components but omitting computation of the nonlinear combinations of at least some of the components of the first-nonlinear-step input vector in the direction of the eigenvectors of the first-nonlinear-step input vector that are associated with the lowest eigenvalues.

12. A method of processing speech comprising the steps of:
    A. receiving a speech signal;
    B. converting the speech signal to a sequence of digital quantities;

C. subjecting the digital quantities to a sequence of processing steps including a sequence of vector-processing steps whose outputs are multi-element vectors and whose inputs include vector outputs of previous processing steps, the sequence of vector-processing steps including a nonlinear step whose input includes a plurality of time-interval vectors, each element of a time-interval vector representing a speech time interval the same as that represented by the other elements of the same time-interval vector but different from the speech time interval represented by the elements of a different one of the time-interval vectors, the nonlinear step comprising computing combinations of higher than second order of elements of different ones of time-interval vectors and generating as its output a nonlinear-step output vector that includes a separate element representing the result of each such computed combination; and D. modeling the vector output of the sequence of vector-processing steps to generate speech-element-estimate signals that represent respective figures of merit related to the likelihoods that the speech contains respective speech elements.

13. A method as defined in claim 12 wherein the modeling step comprises generating as the speech-element-estimate signals phoneme-estimate signals that represent respective figures of merit related to the likelihoods that the speech contains respective phonemes.

14. A method as defined in claim 12 wherein the vector output of the sequence of vector-processing steps that is modeled in the modeling step includes the nonlinear-step output vector.

15. A method as defined in claim 14 wherein the modeling step comprises generating as the speech-element-estimate signals phoneme-estimate signals that represent respective figures of merit related to the likelihoods that the speech contains respective phonemes.

16. A speech processor adapted for reception of a speech signal and comprising:
A. means for converting the speech signal to a sequence of digital quantities;
B. means for subjecting the digital quantities to a sequence of digital processing steps including a sequence of vector-processing steps whose outputs are multi-element vectors and whose inputs include vector outputs of previous processing steps, the sequence of vector-processing steps including a first nonlinear step, which comprises computing nonlinear combinations of different ones of its input elements to produce a first-nonlinear-step output vector that includes a separate first-nonlinear-step element representing the result of each such computed combination, and a second nonlinear step, which comprises computing nonlinear combinations of different elements of the first-nonlinear-step output vector to produce a second-nonlinear-step output vector that includes a separate second-nonlinear-step element representing the result of each such computed combination; and
C. means for modeling the vector output of the sequence of vector-processing steps to generate speech-element-estimate signals that represent respective figures of merit related to the likelihoods that the speech contains respective speech elements.

17. A speech processor as defined in claim 16 wherein the modeling means comprises means for generating as the speech-element-estimate signals phoneme-estimate signals that represent respective figures of merit related to the likelihoods that the speech contains respective phonemes.

18. A speech processor as defined in claim 16 wherein the vector output of the sequence of vector-processing steps that is modeled in the modeling means includes the second-nonlinear-step output vector.

19. A speech processor as defined in claim 18 wherein the modeling means comprises means for generating as the speech-element-estimate signals phoneme-estimate signals that represent respective figures of merit related to the likelihoods that the speech contains respective phonemes.

20. A speech processor as defined in claim 16 wherein the input of at least one of the nonlinear steps includes a plurality of time-interval vectors, each element of one of the time-interval vectors representing a speech time interval the same as that represented by the other elements of the same time-interval vector but different from the speech time interval represented by the elements of a different one of the time-interval vectors, at least one nonlinear step comprising computing nonlinear combinations of elements of different ones of the time-interval vectors to include in its output a separate element representing the result of each such computed combination.

21. A speech processor as defined in claim 20 wherein the modeling means comprises means for generating as the speech-element-estimate signals phoneme-estimate signals that represent respective figures of merit related to the likelihoods that the speech contains respective phonemes.

22. A speech processor as defined in claim 20 wherein the vector output of the sequence of vector-processing steps that is modeled in the modeling means includes the second-nonlinear-step output vector.

23. A speech processor as defined in claim 26 wherein the modeling means comprises means for generating as the speech-element-estimate signals phoneme-estimate signals that represent respective figures of merit related to the likelihoods that the speech contains respective phonemes.

24. A speech processor as defined in claim 16 wherein the second nonlinear step comprises computing the nonlinear combinations of different elements of the first-nonlinear-step output vector by:
A. computing linear combinations of the first-nonlinear-step elements; and
B. computing nonlinear combinations of different ones of the linear combinations, thereby computing nonlinear combinations of different elements of the first-nonlinear-step output vector.

25. A speech processor as defined in claim 24 wherein:
A. the step of computing linear combinations of the first-nonlinear-step elements comprises computing highest-variance components as the linear combinations, the highest-variance components being the components of the first-nonlinear-step input vector in the directions of the eigenvectors of the first-nonlinear-step input vector's covariance matrix that are associated with the greatest eigenvalues; and
B. the step of computing nonlinear combinations of different ones of the linear combinations comprises computing nonlinear combinations of the highest-variance components but omitting computation of the nonlinear combinations of at least some of the components of the first-nonlinear-step input vector in the directions of the eigenvectors of the first-nonlinear-step input vector that are associated with the lowest eigenvalues.

26. A speech processor adapted for reception of speech and comprising:
   A. means for converting the speech signal to a sequence of digital quantities;
   . means for subjecting the digital quantities to a sequence of processing steps including a sequence of vector-processing steps whose outputs are multi-element vectors and whose inputs include vector outputs of previous processing steps, the sequence of vector-processing steps including a nonlinear step whose input includes a plurality of time-interval vectors, each element of a time-interval vector representing a speech time interval the same as that represented by the other elements of the same time-interval vector but different from the speech time interval represented by the elements of a different one of the time-interval vectors, the nonlinear step comprising computing combinations of higher than second order of elements of different ones of the time-interval vectors and generating as its output a nonlinear-step output vector that includes a separate element representing the result of each such computed combination; and
   C. means for modeling the vector output of the sequence of vector-processing steps to generate speech-element-estimate signals that represent respective figures of merit related to the likelihoods that the speech contains respective speech elements.

27. A speech processor as defined in claim 26 wherein the modeling means comprises means for generating as the speech-element-estimate signals phoneme-estimate signals that represent respective figures of merit related to the likelihoods that the speech contains respective phonemes.

28. A speech processor as defined in claim 26 wherein the vector output of the sequence of vector-processing steps that is modeled in the modeling means includes the nonlinear-step output vector.

29. A speech processor as defined in claim 28 wherein the modeling means comprises means for generating as the speech-element-estimate signals phoneme-estimate signals that represent respective figures of merit related to the likelihoods that the speech contains respective phonemes.

* * * * *

UNITED STATES PATENT AND TRADEMARK OFFICE
CERTIFICATE OF CORRECTION

PATENT NO. : 5,027,408
DATED : 06-25-1991
INVENTOR(S) : John P. Kroeker, et al.

It is certified that error appears in the above-identified patent and that said Letters Patent is hereby corrected as shown below:

In column 7, line 5, after "[" insert --p-- and after "$p_m$" delete "9" and insert --]--;

In column 15, line 47, delete "L";

In column 24, line 13, delete "form" and insert --from--;

In claim 10, column 24, line 35, delete "6" and insert --2--;

In claim 23, column 26, line 38, delete "26" and insert --22--; and

In claim 26, column 27, line 10, before "." insert --B--.

Signed and Sealed this

Fifteenth Day of December, 1992

Attest:

DOUGLAS B. COMER

*Attesting Officer*   *Acting Commissioner of Patents and Trademarks*